(12) United States Patent
Imaoku et al.

(10) Patent No.: US 9,557,600 B2
(45) Date of Patent: Jan. 31, 2017

(54) BACKLIGHT UNIT AND LIQUID CRYSTAL DISPLAY DEVICE

(75) Inventors: Takao Imaoku, Osaka (JP); Takatomo Yoshioka, Osaka (JP); Kohji Fujiwara, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 617 days.

(21) Appl. No.: 13/643,419

(22) PCT Filed: Mar. 31, 2011

(86) PCT No.: PCT/JP2011/058268
§ 371 (c)(1),
(2), (4) Date: Oct. 25, 2012

(87) PCT Pub. No.: WO2011/135973
PCT Pub. Date: Nov. 3, 2011

(65) Prior Publication Data
US 2013/0038810 A1    Feb. 14, 2013

(30) Foreign Application Priority Data

Apr. 28, 2010    (JP) ................. 2010-104496

(51) Int. Cl.
*G02F 1/1335*    (2006.01)
*G02F 1/1333*    (2006.01)
*H01M 4/04*    (2006.01)

(52) U.S. Cl.
CPC .......... *G02F 1/133603* (2013.01); *G02F 2001/133314* (2013.01); *G02F 2001/133628* (2013.01); *H01M 4/0442* (2013.01)

(58) Field of Classification Search
CPC ............ G02F 1/133608; G02F 1/133603; G02F 2001/133314; G02F 2001/133628; G02F 1/133385; G02F 2201/36; G02F 1/133382; G02F 1/133606;
(Continued)

(56) References Cited

U.S. PATENT DOCUMENTS 6,327,091 B1 * 12/2001 Agano ................. G02B 5/0226
359/452
7,267,596 B2 * 9/2007 Lambertini ............ B82Y 20/00
257/E33.068
(Continued)

FOREIGN PATENT DOCUMENTS

JP    2008-305713 A    12/2008
JP    2009-128394 A    6/2009
(Continued)

OTHER PUBLICATIONS

International Search Report PCT/ISA/210.
International Preliminary Report on Patentability dated Dec. 20, 2012.

*Primary Examiner* — Paisley L Arendt
*Assistant Examiner* — Angela Davison
(74) *Attorney, Agent, or Firm* — Harness, Dickey & Pierce, P.L.C.

(57) ABSTRACT

A backlight unit includes excellent heat radiation characteristics. The backlight unit of an embodiment of the present invention includes a chassis and a light source attached to the chassis. As the light source, an LED is preferably used. The chassis includes an aluminum base or aluminum layer, and a porous alumina layer or pore-sealed porous alumina layer provided on the surface of the aluminum base or aluminum layer.

12 Claims, 18 Drawing Sheets

(58) Field of Classification Search
CPC .............. G02F 1/133504; G02F 1/133611;
G02F 1/133602; G02F
2001/133507; G02B 6/0073; G02B
6/0083; G02B 6/0051; G02B
5/0242; G02B 5/02; G02B 5/0205; G02B
5/021; G02B 5/0215; G02B
5/0221; G02B 5/0226; G02B 5/0236;
G02B 5/0247; G02B 5/0257; G02B
5/0263; G09F 13/00; G09F 13/04; G09F
13/0404; G09F 13/0413; G09F 13/0445;
G09F 13/22; G09F 2013/222; H05K
5/04; H05K 5/0017; Y10S
362/812; Y10S 362/80; Y10S 345/905;
H01M 4/0442; G06F 1/20; G06F 1/203
USPC .............. 349/64, 112, 58, 61; 362/246, 355,
362/97.1–97.3; 359/599, 707; 313/116;
40/541, 549, 564; 361/679.01, 688, 829,
361/600, 679.02, 679.46, 679.54, 704,
361/706, 709, 831; 345/905; 348/789, 794
See application file for complete search history.

(56) References Cited

U.S. PATENT DOCUMENTS

| | | | |
|---|---|---|---|
| 7,434,978 B2* | 10/2008 | Chou | G02F 1/133603 |
| | | | 362/612 |
| 7,914,194 B2* | 3/2011 | Park | G02F 1/133603 |
| | | | 362/613 |
| 2008/0304288 A1* | 12/2008 | Iwasaki | F21V 29/02 |
| | | | 362/632 |
| 2011/0100827 A1 | 5/2011 | Hayashi et al. | |
| 2011/0134364 A1 | 6/2011 | Neyama et al. | |
| 2012/0213971 A1 | 8/2012 | Ihara | |
| 2012/0325670 A1 | 12/2012 | Nakamatsu et al. | |

FOREIGN PATENT DOCUMENTS

| | | |
|---|---|---|
| JP | 2009-255534 A | 11/2009 |
| JP | 2010-052304 A | 3/2010 |
| WO | WO-2009/147858 A1 | 12/2009 |
| WO | WO-2010-026811 A1 | 3/2010 |

\* cited by examiner (a)

Prior Art

BACKLIGHT UNIT AND LIQUID CRYSTAL DISPLAY DEVICE

TECHNICAL FIELD

The present invention relates to a backlight unit and a liquid crystal display device.

BACKGROUND ART

Liquid crystal display devices have various advantages, such as light weight, slim body, small power consumption, etc., and have been used not only as a small-size display device in a display section of mobile phones but also as a large-size television display. Liquid crystal panels themselves do not emit light, in comparison to self-emitting panels, such as cathode ray tubes (CRT) and plasma display panels (PDP). Thus, in common liquid crystal display devices which provide high luminance, light from a backlight unit which is provided at the rear surface of a liquid crystal panel is utilized for display.

In the backlight unit, a light source is attached to a chassis. Therefore, the chassis needs to have strength to some extent. For example, Patent Document 1 discloses a backlight unit which includes a chassis that is formed of a cold rolled steel sheet. Note that, in the backlight unit of Patent Document 1, there is a hole for securing the light source to the chassis.

CITATION LIST

Patent Literature

Patent Document 1: Japanese Laid-Open Patent Publication No. 2009-128394

SUMMARY OF INVENTION

Technical Problem

However, in the chassis of Patent Document 1, the heat radiation characteristics of the backlight unit are not sufficient so that the operation can sometimes be unstable. One of the display devices other than so-called television devices which has been receiving attention in recent years is a digital signage device. When a liquid crystal display device is used as a digital signage device placed outdoor in the sunlight, it is necessary to sufficiently increase the luminance of the backlight unit such that the display can be visually perceivable. In this case, there is a probability that heat generated in the backlight unit will cause an unstable operation.

The present invention was conceived in view of the above problems. One of the objects of the present invention is to provide a backlight unit which has excellent heat radiation characteristics and a liquid crystal display device.

Solution to Problem

A backlight unit of the present invention includes: a chassis; and a light source attached to the chassis, wherein the chassis includes an aluminum base or aluminum layer, and a porous alumina layer or pore-sealed porous alumina layer provided on a surface of the aluminum base or aluminum layer.

In one embodiment, the backlight unit further includes a light source control circuit for controlling the light source.

In one embodiment, the chassis has a front surface and a rear surface, the light source is provided on the front surface of the chassis, and the light source control circuit is provided on the rear surface of the chassis.

In one embodiment, the chassis has an opening, and the backlight unit further includes a connection portion in the opening for electrically coupling the light source control circuit and the light source.

In one embodiment, the light source includes a light-emitting diode.

In one embodiment, the backlight unit further includes at least one of an air supply fan and a heat exhaust fan.

A backlight unit of the present invention includes: a chassis which has a front surface and a rear surface; and a light-emitting diode attached to the front surface of the chassis, and a fan provided on the rear surface of the chassis.

In one embodiment, the fan includes at least one of an air supply fan and a heat exhaust fan.

In one embodiment, the air supply fan is attached generally parallel to a direction normal to the rear surface of the chassis.

In one embodiment, the heat exhaust fan is attached generally perpendicular to a direction normal to the rear surface of the chassis.

A liquid crystal display device of the present invention includes: a liquid crystal panel; and the above-described backlight unit for emitting light to the liquid crystal panel.

A digital signage device of the present invention includes the above-described liquid crystal display device.

Advantageous Effects of Invention

According to the present invention, a backlight unit which has good heat radiation characteristics and a liquid crystal display device can be provided.

DESCRIPTION OF EMBODIMENTS

Hereinafter, embodiments of a backlight unit and a liquid crystal display device of the present invention are described with reference to the drawings. Note that, however, the present invention is not limited to the embodiments that will be described below.

Embodiment 1

Figure 1:
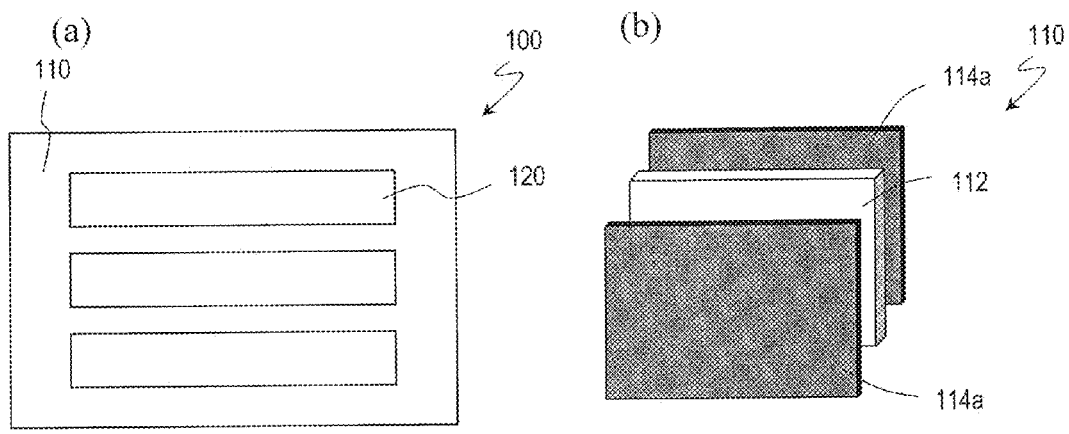
FIG. 1 (*a*) is a schematic diagram of the first embodiment of a backlight unit of the present invention. (*b*) is an exploded schematic perspective view of a chassis of the backlight unit shown in (*a*).

Hereinafter, the first embodiment of the backlight unit of the present invention is described. FIG. 1(a) is a schematic front view of a backlight unit 100 of the present embodiment. The backlight unit 100 includes a chassis 110 and a light source 120 attached to the chassis 110. The light source 120 used may be, for example, a light emitting diode (LED). Alternatively, the light source 120 used may be a cold cathode fluorescent lamp (CCFL). Note that, however, using a LED as the light source 120 enables reduction of the power consumption and improvement of the contrast ratio.

FIG. 1(b) is an exploded schematic perspective view of the chassis 110. In the backlight unit 100 of the present embodiment, the chassis 110 includes an aluminum base 112 and pore-sealed porous alumina layers 114a. The porous alumina layers 114a are provided on the surfaces of the aluminum base 112. From the viewpoint of the strength, the thickness of the aluminum base 112 is preferably not less than 1.0 mm. For example, it is 1.5 mm. The thickness of the porous alumina layers 114a is, for example, about 10 μm. Note that, as the thickness of the porous alumina layers 114a increases, the heat radiation characteristics improve and, however, the process time and the cost which is incurred according to the process time increase. Inside the chassis 110, there is the aluminum base 112 which has relatively high heat conductivity. On the surfaces of the aluminum base 112, the porous alumina layers 114a are provided which are made of aluminum oxide that has relatively high heat emission rate.

When the light source 120 is turned on, heat is produced by an electric current which is supplied to the light source 120. When the heat is transferred to the chassis 110, the heat efficiently spreads throughout the entirety of the aluminum base 112 that has high heat conductivity and efficiently radiates outside from the porous alumina layers 114a that have a high heat emission rate. Thus, the chassis 110 is capable of efficiently releasing the heat produced in the backlight unit 100 to the outside and is capable of securing the operation stability.

For example, the chassis 110 is fabricated as follows. First, a 1.5 mm thick aluminum base 112 is provided. The aluminum base 112 has relatively high rigidity. For example, the aluminum purity of the aluminum base 112 is not less than 99.50 mass % and less than 99.99 mass %. The aluminum base 112 contains an impurity. The impurity may be at least one element which is selected from the group consisting of Fe, Si, Cu, Mn, Zn, Ni, Ti, Pb, Sn and Mg. The aluminum base 112 preferably contains Mg as an impurity. Such an aluminum base is also referred to as an aluminum alloy.

Then, anodization is performed on the aluminum base 112. The anodization is realized by, for example, immersing the aluminum base 112 in an electrolytic solution, which may be a sulfuric acid aqueous solution with a concentration of not less than 10 mass % and not more than 20 mass % and with a bath temperature of not less than 20° C. and not more than 30° C., with current density DC of not less than 1 A/dm$^2$ and not more than 2 A/dm$^2$, with an applied voltage of not less than 10 V and not more than 30 V, for not less than 10 minutes and not more than 30 minutes, whereby a porous alumina layer is formed. Such an anodization is also referred to as "alumilite process". A film formed by the alumilite process is also referred to as "alumilite film".

When necessary, an etching process may be performed after the anodization. By the etching process, the pore diameter and depth of micropores formed by the anodization can be increased. The etching solution used may be, for example, an aqueous solution of 10 mass % phosphoric acid or organic acid, such as formic acid, acetic acid, citric acid, or the like, or a chromium-phosphoric acid mixture solution. When necessary, the above-described anodization and the etching process may be repeatedly performed.

Thereafter, a pore sealing process is performed. For example, the pore sealing process is performed using steam under pressure or boiling water. Specifically, the pore sealing process may be performed with application of steam at several atms. Alternatively, the pore sealing process may be performed by heating with boiling water which is regulated to about pH 5.5 to 6.5 for several tens of minutes. In either case, a pore sealing agent, such as nickel acetate or the like, may be added. In this way, the chassis 110 is fabricated.

Figure 2:
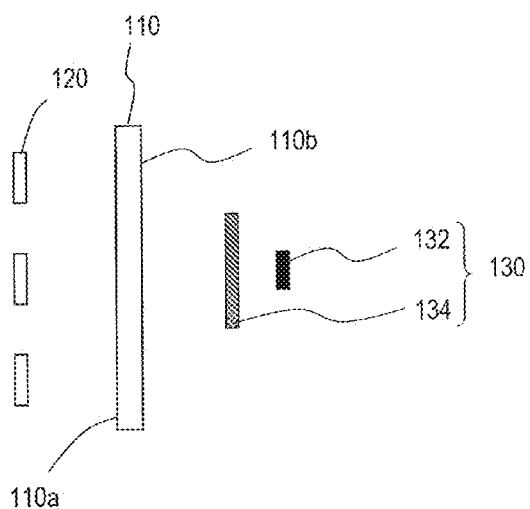
FIG. 2 An exploded schematic side view of the backlight unit shown in FIG. 1.

FIG. 2 is an exploded schematic side view of the backlight unit 100. The chassis 110 has a front surface 110a and a rear surface 110b. The light source 120 is provided on the front surface 110a of the chassis 110. The backlight unit 100 further includes a light source driver section 130 for controlling the light source 120. The light source driver section 130 is provided on the rear surface 110b of the chassis 110, while the light source 120 is provided on the front surface 110a of the chassis 110. Note that the chassis 110 has openings 116 (see FIG. 5(b)). Electrical connection between the light source 120 and the light source driver section 130 is realized through the openings 116.

The light source driver section 130 includes a light source control circuit 132 and a light source control board 134 which supports the light source control circuit 132. The light source control circuit 132 is mounted as an integration chip. For example, the operation guarantee temperature of the light source control circuit 132 is about 120° C. The light source control board 134 includes an insulating substrate and wirings provided on the insulating substrate. The insulating substrate is, for example, Flame Retardant Type 4 (FR4).

When the light source driver section 130 drives the light source 120, heat is produced from the light source driver section 130. Note that, generally speaking, the quantity of heat produced in the light source driver section 130 is greater than the quantity of heat produced in the light source 120. The temperature of the light source driver section 130 is higher than that of the light source 120. In the case where the heat produced from the light source driver section 130 when the light source driver section 130 drives the light source 120 is transferred to the chassis 110, the heat efficiently spreads throughout the entirety of the aluminum base 112 because the aluminum base 112 has high heat conductivity, and efficiently radiates outside from the porous alumina layers 114a that have a high heat emission rate. Thus, the chassis 110 is capable of efficiently releasing the heat produced from the light source driver section 130 to the outside and is capable of securing the operation stability. Note that the chassis 110 to which the light source 120 is attached is covered with, for example, a cover member (not shown herein).

Figure 3:
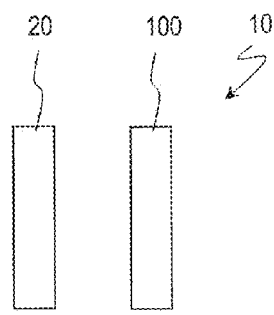
FIG. 3 A schematic view of a liquid crystal display device which includes the backlight unit shown in FIG. 1.

FIG. 3 shows a schematic diagram of a liquid crystal display device 10 which includes the backlight unit 100. The liquid crystal display device 10 includes the backlight unit 100 and a liquid crystal panel 20.

The liquid crystal panel 20 has a plurality of pixels arranged in a matrix of multiple rows and multiple columns. Typically, the pixels include red pixels, green pixels, and blue pixels. A color display pixel consisting of a red pixel, a green pixel, and a blue pixel serves as a display unit of an arbitrary color. Note that the color display pixel may further include another pixel other than the red, green and blue pixels (e.g., a yellow pixel). For example, the color display pixel may further include a white pixel in addition to the red, green and blue pixels. Addition of the white pixel enables efficient increase of the luminance. Note that, although not shown herein, the liquid crystal panel 20 includes a front substrate, a rear substrate, and a liquid crystal layer interposed between the substrates.

The backlight unit 100 may be a direct lighting type backlight. For example, a diffuser plate, a lens sheet (H2K), a brightness enhancement film (BEF), and another brightness enhancement film (Dual Brightness Enhancement Film: DBEF) may be provided in this order between the chassis 110 and the liquid crystal panel 20.

Alternatively, the backlight unit 100 may be an edge light type backlight. For example, in the cover member, a light guide plate may be provided together with the chassis 110 to which the light source 120 is attached.

Figure 4:
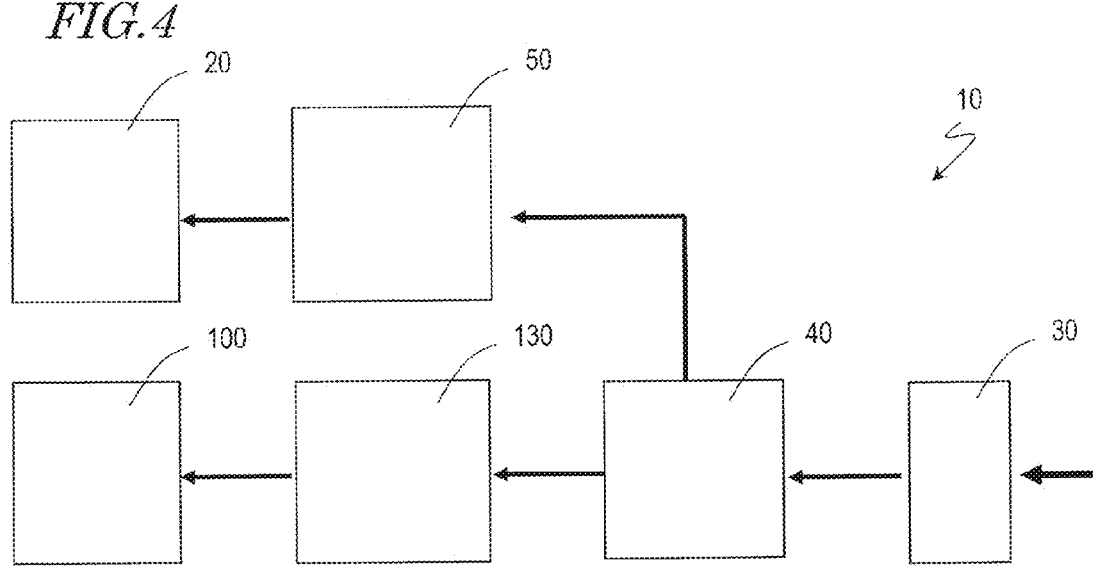
FIG. 4 A block diagram of a liquid crystal display device shown in FIG. 3.

FIG. 4 shows a block diagram of the liquid crystal display device 10. The liquid crystal display device 10 includes the liquid crystal panel 20, a signal input section 30, a picture processing section 40, a signal conversion section 50, the light source driver section 130, and the backlight unit 100. To the signal input section 30, an input picture signal is input. The picture processing section 40 generates a display signal and a backlight driving signal based on the input picture signal. The signal conversion section 50 generates a scan signal, a source signal, and the like, based on the display signal. The light source driver section 130 controls the light source 120 (see FIG. 2) based on the backlight driving signal. For example, the light source driver section 130 may be provided in a timing controller. Note that, as will be described later, the light source driver section 130 may be attached to the backlight unit 100. Also, either of the signal input section 30, the picture processing section 40, or the signal conversion section 50 may be provided in a frame region of the liquid crystal panel 20. Note that the light source driver section 130 may control switching on and off of the light source 120 separately for respective one of the regions when necessary. This enables displaying with a high contrast ratio.

As described above, a LED is preferably used as the light source 120. In this specification, in the case where a LED is used as the light source 120, the light source driver section, the light source control circuit, and the light source control board are sometimes referred to as "LED driver section", "LED control circuit", and "LED control board", respectively.

Figure 5:
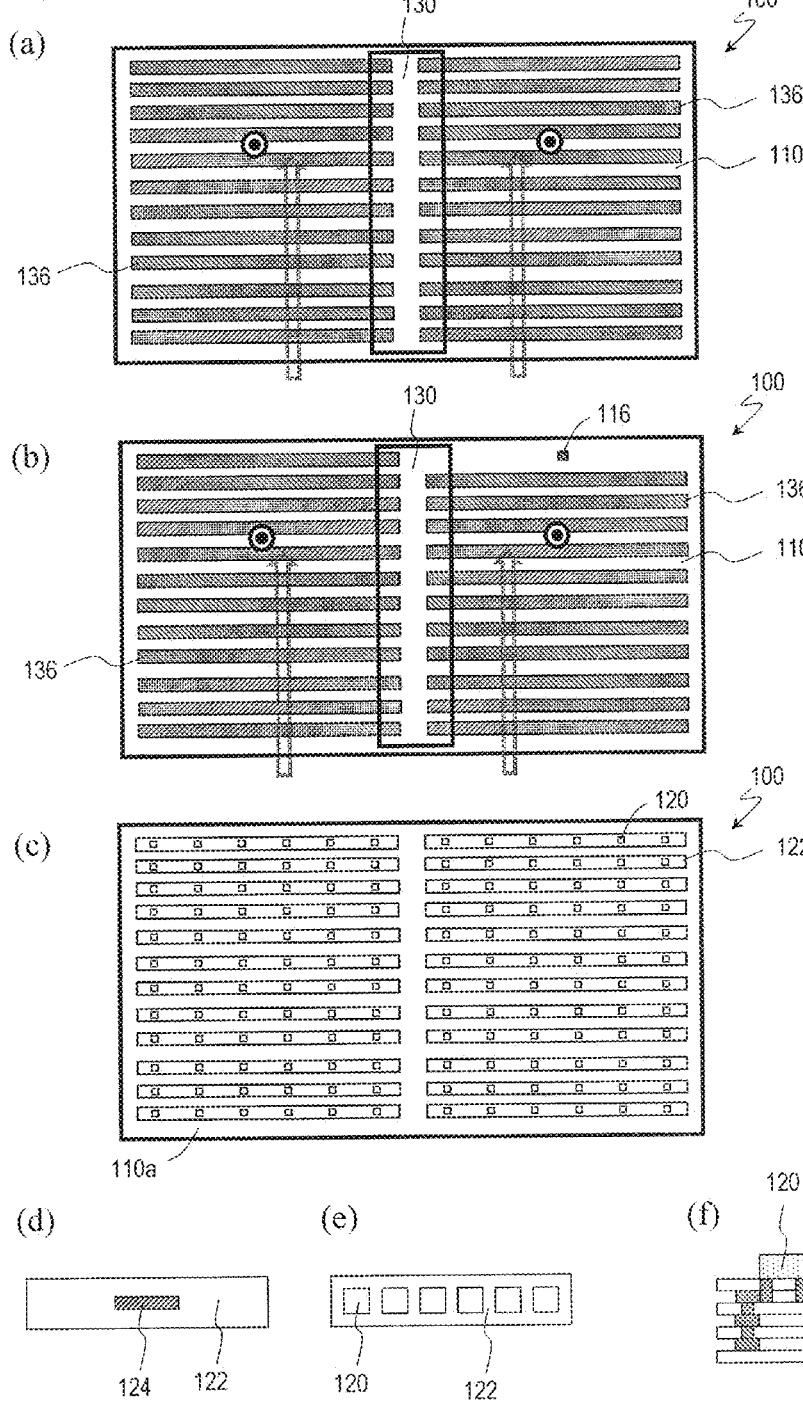
FIGS. 5 (*a*) and (*b*) are schematic rear views of the backlight unit shown in FIG. 1. (*c*) is a schematic front view of the backlight unit shown in FIG. 1. (*d*) is a schematic rear view of a LED substrate of the backlight unit shown in FIG. 1. (*e*) is a schematic front view of the LED substrate shown in (*d*). (*f*) is a schematic partial cross-sectional view of the LED substrate shown in (*d*).

Now, the backlight unit 100 is described with reference to FIG. 5. FIG. 5(a) shows a rear surface of the backlight unit 100. The LED driver section 130 is provided at the center of the rear surface 110b of the chassis 110. Flexible substrates 136 extend in the left direction or the right direction from the LED driver section 130. Note that, herein, the flexible substrates 136 are provided on the rear surface 110b of the chassis 110, although the present invention is not limited to this example. However, if the flexible substrates 136 are provided on the front surface 110a of the chassis 110, LEDs 120 cannot be provided in a portion which is covered with the flexible substrates 136, so that uneven luminance can sometimes occur. Alternatively, if the flexible substrates 136 are provided on a side surface of the chassis 110, the frame region will be enlarged. Thus, the flexible substrates 136 are preferably provided on the rear surface 110b of the chassis 110. This arrangement enables to prevent occurrence of the luminance unevenness of the LEDs 120 and enlargement of the frame region. Note that, herein, the flexible substrates 136 are arranged on the rear surface 110b of the chassis 110, in a plurality of rows in each of two columns (left and right columns). Here, 24 flexible substrates 136 are arranged in 12 rows and 2 columns.

FIG. 5(b) is a diagram where one flexible substrate 136 at the top of the right column on the sheet of the drawing is omitted from the backlight unit 100 shown in FIG. 5(a). As shown in FIG. 5(b), the chassis 110 has openings 116 corresponding to respective ones of the flexible substrates 136.

FIG. 5(c) shows the front surface of the backlight unit 100. A plurality of LED substrates 122, each of which extends along the horizontal direction, are attached to the front surface 110a of the chassis 110. Each of the LED substrates 122 is provided with a plurality of LEDs 120. In this way, the LEDs 120 are attached to the chassis 110 via the LED substrates 122.

The LED substrates 122 on the front surface 110a of the chassis 110 are arranged so as to correspond to the flexible substrates 136 on the rear surface 110b of the chassis 110. Specifically, the LED substrates 122 are arranged on the front surface 110a of the chassis 110, in a plurality of rows in each of two columns (left and right columns). Here, 24 LED substrates 122 are arranged in 12 rows and 2 columns.

FIG. 5(d) shows the rear surface of the LED substrate 122. The rear surface of the LED substrate 122 has a connection portion 124. The size of the connection portion 124 is designed so as to accord with the size of the opening 116 of the chassis 110 shown in FIG. 5(b). When the LED substrates 122 are attached to the front surface 110a of the chassis 110, the connection portion 124 extends from the openings 116 to the rear surface 110b of the chassis 110 such that the connection portion 124 is engaged with the flexible substrates 136. In this way, the light source 120 is electrically coupled with the LED control circuit 132 via the connection portion 124 and the flexible substrate 136.

FIG. 5(e) shows the front surface of the LED substrate 122. The front surface of the LED substrate 122 is provided with a plurality of LEDs 120.

FIG. 5(f) shows a cross-section of one of the LEDs 120 of the LED substrate 122. There are wirings 126 between the LED 120 and the LED substrate 122. By configuring the LED substrate 122 so as to have a multilayer structure, the width of the wirings 126 can be increased without omitting the circuit provided in the LED substrate 122, so that a large electric current can be supplied to the LED 120. Note that the rear surface of the LED substrate 122 may also be provided with wirings. Further, at least a region of the front surface of the LED substrate 122 on which the LED 120 is not provided is preferably coated with white paint.

As appreciated from the above, the LEDs 120 are electrically coupled with the LED driver section 130 via the flexible substrates 136. Note that, herein, the LEDs 120 are attached to the front surface 110a of the chassis 110 via the LED substrates 122, although the present invention is not limited to this example. The LEDs 120 may be attached to the front surface 110a of the chassis 110 without being attached to the LED substrates 122.

When the liquid crystal display device 10 is used as a common television device, the backlight unit 100 needs to have the luminance of about 500 cd/m$^2$. When the liquid crystal display device 10 is used for a digital signage device which is for use in an outdoor environment, the backlight unit 100 needs to have the luminance of not less than 1000 cd/m$^2$ (more preferably, about 2500 cd/m$^2$).

When, for example, a 52-inch liquid crystal display device 10 is used as a common television device, the emission luminance of the backlight unit 100 is about 450 cd/m$^2$, and the total power of the light source 120 and the light source driver section 130 is about 100 W, so that an electric current of about 1.0 A flows. On the other hand, when a 52-inch liquid crystal display device 10 is used as a display for digital signage, the emission luminance of the backlight unit 100 is about 2000 cd/m$^2$, and the total power of the light source 120 and the light source driver section 130 is about 400 W, so that an electric current of about 9.0 A flows. When such a large electric current flows, improvement of the heat radiation characteristics of the backlight unit is more demanded.

Figure 6:
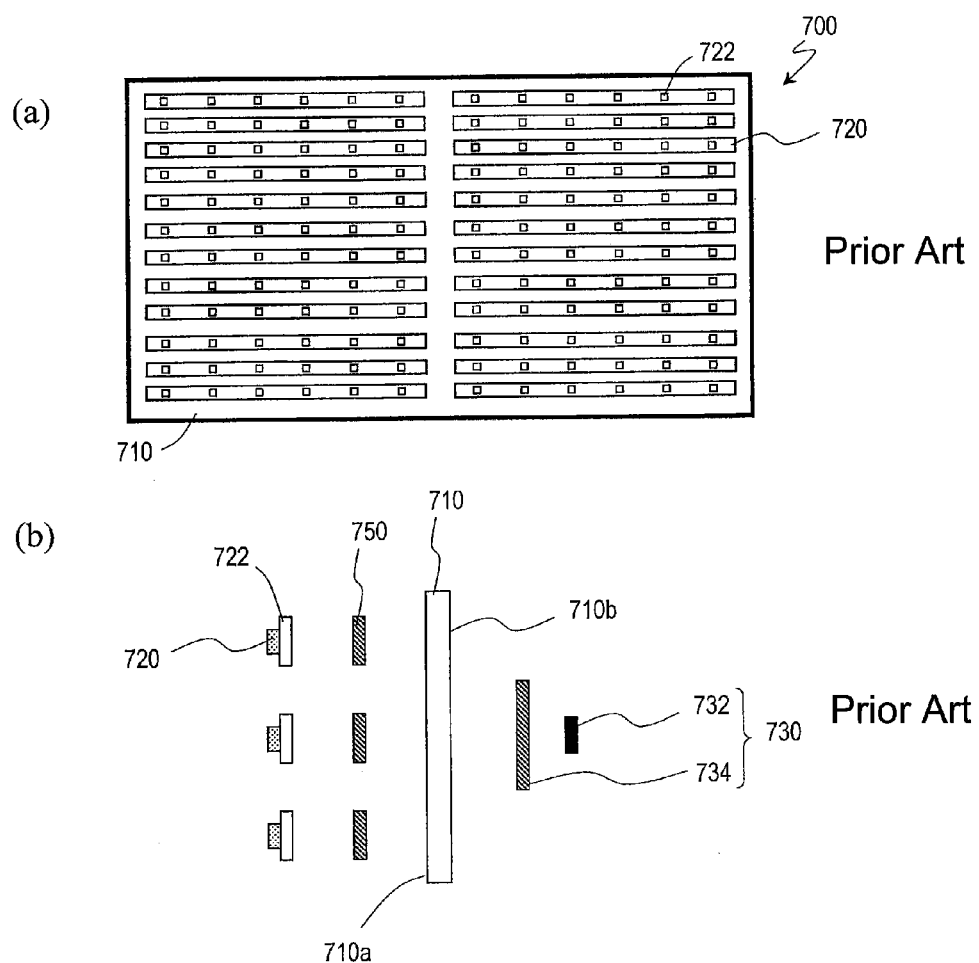
FIG. 6 (*a*) is a schematic front view of a backlight unit of Comparative Example 1. (*b*) is an exploded schematic side view of (*a*).

Hereinafter, the advantages of the backlight unit 100 of the present embodiment are described in comparison to the backlight unit of Comparative Example 1. Firstly, the backlight unit of Comparative Example 1 is described with reference to FIG. 6. FIG. 6(a) is a schematic front view of a backlight unit 700 of Comparative Example 1. FIG. 6(b) is an exploded schematic side view of the backlight unit 700.

The backlight unit 700 has the same configuration as the backlight unit 100 except that a chassis 710 is formed of an electrogalvanized steel sheet (Steel Electrolytic Cold Commercial: SECC). Note that, in the backlight unit 700, to prevent electrical conduction between the chassis 710 and LEDs 720, the LEDs 720 are provided on the front surface 710a of the chassis 710 via insulating sheets 750.

Figure 7:
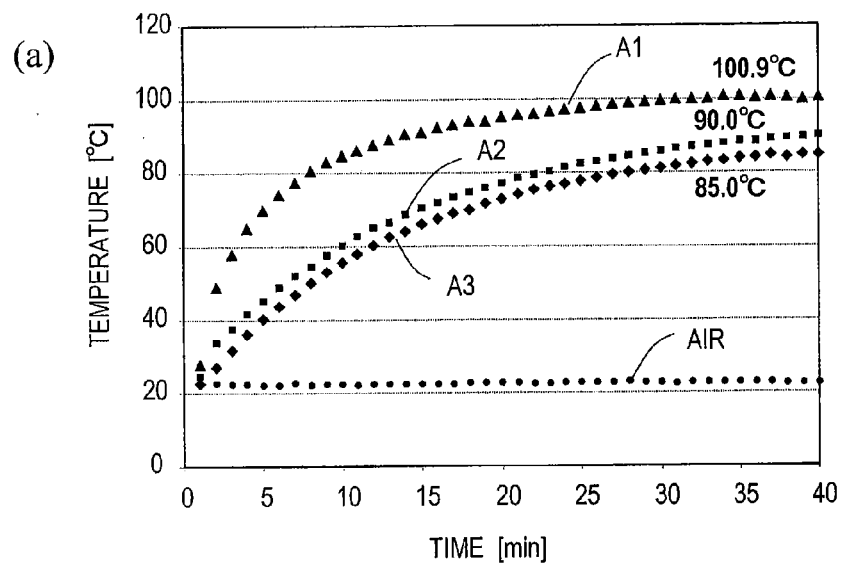
FIG. 7 (*a*) is a graph showing variation of the temperatures over time at respective positions of the backlight unit of Comparative Example 1. (*b*) is a graph showing variation of the temperatures over time at respective positions of the backlight unit of the first embodiment.
Figure 7:
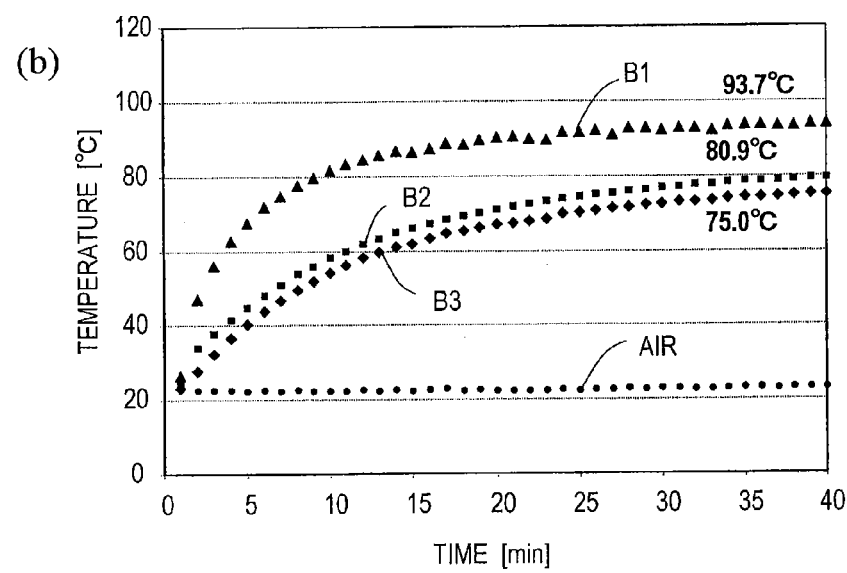

Hereinafter, the measurement results of the temperature at a plurality of positions in the backlight units 100 and 700 are described with reference to FIG. 7. The measurement of the temperature was carried out on the rear surfaces 110b and 710b of the chassis 110 and 710, the LEDs 120 and 720, and the LED control circuits 132 and 732 using a thermocouple. The measurement of the backlight unit 100 was carried out by modifying the parameters of signals generated in the picture processing section 40 and/or the LED driver section 130 shown in FIG. 4. The measurement of the backlight unit 700 was also carried out in the same way. In FIG. 7, the horizontal axis represents the time from switching on of the LEDs 120 and 720, and the vertical axis represents the temperature at the respective positions of the backlight units 100 and 700.

FIG. 7(a) is a graph showing the temperature variation of the backlight unit 700. In FIG. 7(a), A1 represents the temperature variation of the LED control circuit 732, A2 represents the temperature variation of the LEDs 720, and A3 represents the temperature variation of the rear surface 710b of the chassis 710. Note that the temperature of air which is distant from the backlight unit 700 is about 22° C.

FIG. 7(b) is a graph showing the temperature variation of the backlight unit 100. In FIG. 7(b), B1 represents the temperature variation of the LED control circuit 132, B2 represents the temperature variation of the LEDs 120, and B3 represents the temperature variation of the rear surface 110b of the chassis 110. Note that, herein, for the sake of comparison, the LEDs 120 are provided on the front surface 110a of the chassis 110 via an insulating sheet 150 (see FIG. 10).

As appreciated from FIG. 7(a) and FIG. 7(b), the temperature reaches equilibrium in about 40 minutes. In each of FIG. 7(a) and FIG. 7(b), the temperature which has reached equilibrium is shown. In this specification, such a temperature is also referred to as "equilibrium temperature". As appreciated from the comparison of FIG. 7(a) and FIG. 7(b), the equilibrium temperatures at the respective positions of the backlight unit 100 are lower than those of the backlight unit 700 by about 7° C. to 10° C. The chassis 110 includes, in its surface, the porous alumina layers 114a that have a high heat emission rate, and it is therefore expected that the heat radiation characteristics are improved. Also, there is the aluminum base 112, which has higher heat conductivity than SECC, in the inner part of the chassis 110, and it is therefore expected that heat transferred to the chassis 110 spreads throughout the entirety of the chassis 110, and as a result, release of the heat is brought about throughout the entirety of the chassis 110. Note that, comparing the equilibrium temperatures in the chassis 110, the equilibrium temperature of the LED control circuit 132 was the highest, while the equilibrium temperature of the rear surface 110b of the chassis 110 was the lowest.

Figure 8:
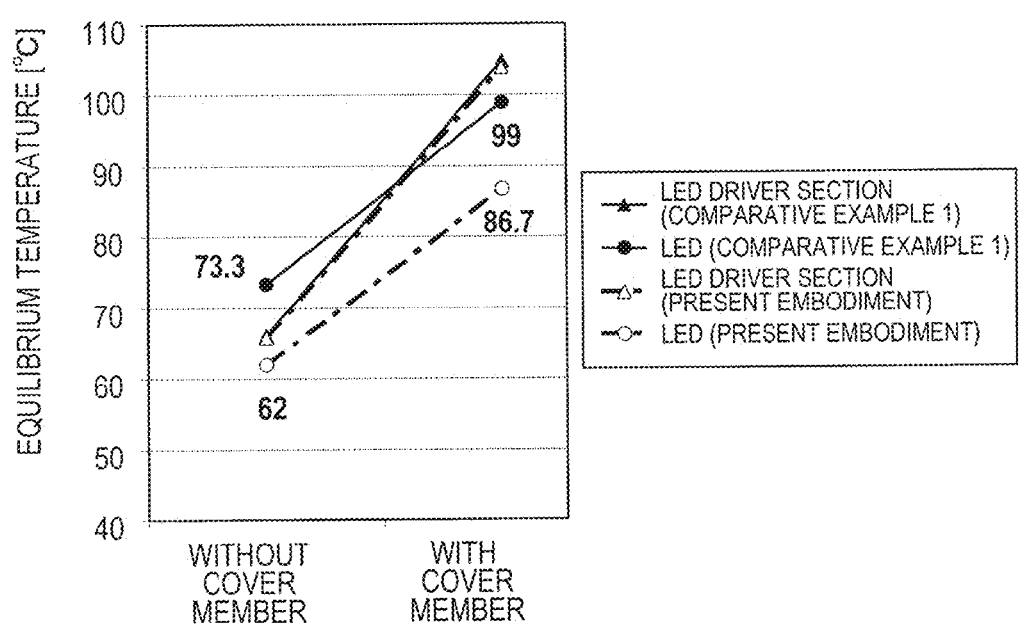
FIG. 8 A graph showing the equilibrium temperatures of the backlight units of the first embodiment and Comparative Example 1.

FIG. 8 illustrates the equilibrium temperatures of the backlight units 100 and 700. Here, the temperatures of the LEDs 120 and 720 and the LED driver sections 130 and 730 were measured.

The backlight unit 100 includes the plurality of LEDs 120 and, however, the forward voltage Vf of the LEDs 120 is not constant but varying. Now, consider a case where all the LEDs 120 are switched on. If the LED driver section 130 supplies a common voltage to the LEDs 120 such that LEDs 120 whose forward voltage Vf is high are switches on, LEDs 120 whose forward voltage Vf is low are supplied with excessive electric power. Thus, the LED driver section 130 may prevent supply of excessive electric power to the LEDs 120 whose forward voltage Vf is low. In this case, this electric power emerges as heat in the LED control circuit 132.

As appreciated from FIG. 8, the equilibrium temperatures of the LEDs 120 and 720 and the LED driver sections 130 and 730 increase by 20° C. or more because of the cover member. This is probably because the cover member interrupts the flow of air.

Next, the equilibrium temperatures of the backlight units 100 and 700 are separately discussed. When the cover member is not provided, the equilibrium temperature of the LEDs 720 is higher than that of the LED driver section 730 in the backlight unit 700. This is probably because the average value of the forward voltages Vf of the LEDs 720 is high, and therefore, supply of excessive electric power is necessary, so that a large quantity of heat is produced in the LEDs 720. When the cover member is not provided, the equilibrium temperature of the LED driver section 130 is higher than that of the LEDs 120 in the backlight unit 100. This is probably because, due to the chassis 110, the heat produced in the LEDs 120 was efficiently released.

On the other hand, when the cover member is provided, the equilibrium temperature of the LEDs 720 is lower than that of the LED driver section 730 in the backlight unit 700. This is probably because the cover member reduces the release of heat from the LED driver section 730. When the cover member is provided, the equilibrium temperature of the LED driver section 130 is higher than that of the LEDs 120 in the backlight unit 100. This is, probably, not only because the heat produced in the LEDs 120 was efficiently released due to the chassis 110 but also because the cover member reduces the release of heat from the LED driver section 130.

Next, the equilibrium temperatures of the LEDs 120 and the LEDs 720 are discussed. When the cover member is not provided, the equilibrium temperature of the LEDs 120 is lower than that of the LEDs 720 by 10° C. or more. When the cover member is provided, the equilibrium temperature of the LEDs 120 is lower than that of the LEDs 720 by 10° C. or more. Thus, the equilibrium temperature of the LEDs 120 decreases more than that of the LEDs 720 according to the chassis 110 and 710. It is inferred that the difference in equilibrium temperature between the LEDs 120 and 720 is attributed to the difference between the chassis 110 and the chassis 710. Note that the change of the equilibrium temperature which is achieved by provision of the cover member is generally equal among the LEDs 120 and 720. This is probably because the power consumptions of the LEDs 120 and 720 are generally equal to each other.

Next, the equilibrium temperatures of the LED driver section 130 and the LED driver section 730 are discussed. When the cover member is not provided, the equilibrium temperature of the LED driver section 130 is generally equal to that of the LED driver section 730. Also, when the cover member is provided, the equilibrium temperature of the LED driver section 130 is generally equal to that of the LED driver section 730. This is probably because the LED driver sections 130 and 730 drive the LEDs 120 and 720 according to the forward voltages Vf of the LEDs 120 and 720, so that the quantities of heat produced from the LED driver sections 130 and 730 are generally equal to each other.

The changes of the equilibrium temperatures of the LED driver sections 130 and 730 which are brought about according to the presence and absence of the cover member are larger than the changes of the equilibrium temperatures of the LEDs 120 and 720. The LED driver sections 130 and 730 are positioned closer to the cover member than the LEDs 120 and 720 are. The LED driver sections 130 and 730 are interposed between their own insulating substrates which have low heat conductivity (e.g., FR4) and the cover member. Thus, it is inferred that the temperatures of the LED driver sections 130 and 730 are more likely to increase than the LEDs 120 and 720.

Now, the heat emission rate is discussed. The heat emission rate of SECC is very low, e.g., lower than 0.1, while the average emissivity of the chassis 110 is as high as about 0.78, although it also depends on the thickness of the porous alumina layer 114. Note that the heat emission rate of aluminum oxide is 0.85.

Now, the heat conductivity is discussed. The heat conductivity of SECC is 53 W/mK, while the heat conductivity of the aluminum base 112 is 120 W/mK. Note that the heat conductivity of pure aluminum is still higher, specifically 236 W/mK, but the pure aluminum does not have sufficient strength.

Some aluminum materials do not have sufficient strength. It is preferred that an aluminum material which has better mechanical strength than SECC is used as the aluminum base 112. The tensile strength, proof stress, and elongation of SECC are 350 N/mm$^2$, 213 N/mm$^2$, and 21%, respectively. In view of this, an aluminum alloy whose tensile strength, proof stress, and elongation are 400 N/mm$^2$, 310 N/mm$^2$, and 12%, respectively, is preferably used as the aluminum base 112. Alternatively, 5000 series aluminum alloy may be used as the aluminum base 112. For example, an aluminum alloy whose tensile strength, proof stress, and elongation are 240 N/mm$^2$, 190 N/mm$^2$, and 12%, respectively, may be used as the aluminum base 112.

As described above, the backlight unit 700 includes the insulating sheets 750 which are interposed between the chassis 710 and the LEDs 720 in order to prevent electrical conduction between the chassis 710 and the LEDs 720. Thus, from the viewpoint of the heat radiation characteristics, the heat produced in the LEDs 720 is unlikely to be transferred to the chassis 710. Even when insulating heat dissipation sheets which have high heat radiation characteristics are used as the insulating sheets 750, the heat exhaust effect of the insulating heat dissipation sheets is small. This is probably because an adhesive layer portion which is for adhesion of the insulating heat dissipation sheets is made of a resin which has low heat conductivity.

When the thickness of the porous alumina layers 114a is 10 μm, the dielectric breakdown voltage is 540 V. When the thickness of the porous alumina layers 114a is 6 μm, the dielectric breakdown voltage is 360 V. Thus, the breakdown resistance of the chassis 110 and the LED substrates 122 is sufficient.

When the thickness of the porous alumina layer 114a is 10 μm, the surface Vickers hardness Hv of the porous alumina layer 114a is about 200, which is higher than the surface Vickers hardness Hv of a common aluminum base (50) and which is generally equal to the surface Vickers hardness Hv of stainless steel (150 to 200).

The specific gravity of aluminum (Al: 2.7) is about ⅓ of that of SECC (Fe: 7.8), and the chassis 110 has a relatively light weight. Therefore, the cost of transportation and installation can be reduced. Particularly, it is preferably used for a liquid crystal display device 10 which is designed for mount on the wall. Further, provision of the porous alumina layers 114a improves the anticorrosion characteristics.

In the backlight unit 100 of the present embodiment, the chassis 110 includes the porous alumina layers 114a. Therefore, the insulation between the chassis 110 and the light source 120 can be improved, and it is not necessary to use an insulating sheet. As a matter of course, when necessary, insulating sheets may be provided between the chassis 110 and the LED substrates 122.

Next, the advantages of the backlight unit 100 of the present embodiment are described in comparison to the backlight units of Comparative Example 1 and Comparative Example 2. The backlight unit 700 of Comparative Example 1 is the same as that previously described with reference to FIG. 6, and therefore, the description thereof is herein omitted.

Figure 9:
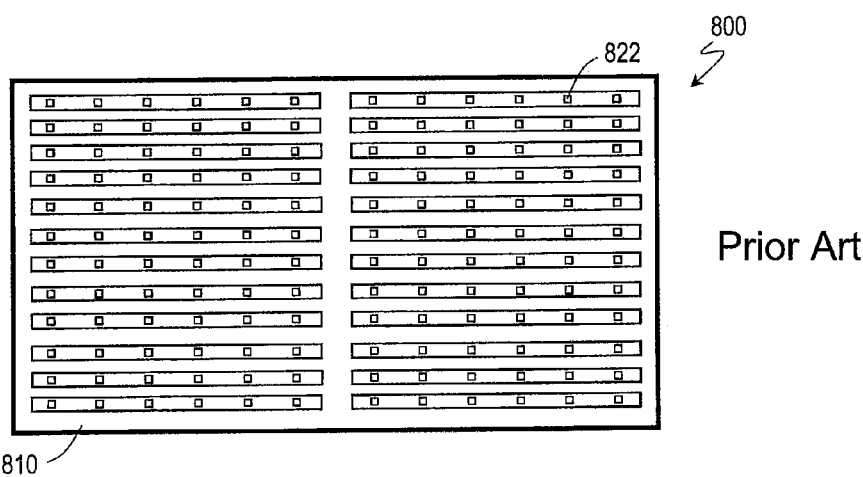
FIG. 9 (*a*) is a schematic front view of a backlight unit of Comparative Example 2. (*b*) is an exploded schematic side view of (*a*).
Figure 9:
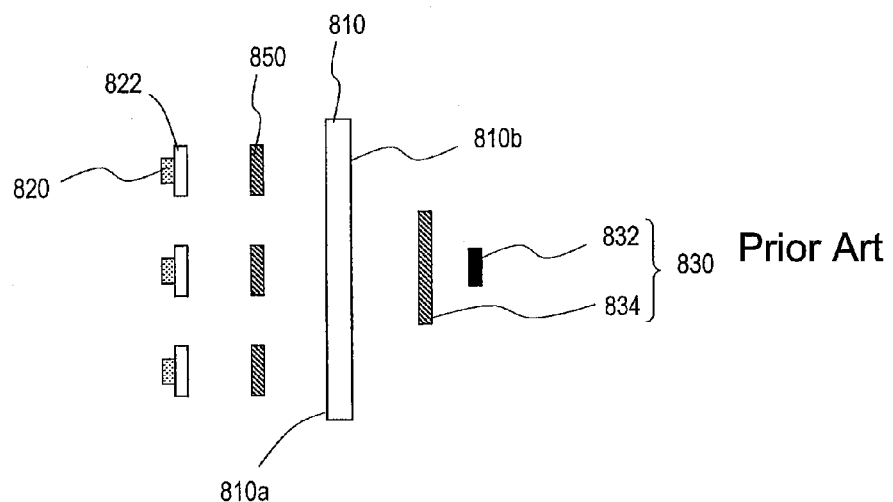

A backlight unit 800 of Comparative Example 2 is described with reference to FIG. 9. FIG. 9(a) is a schematic front view of the backlight unit 800 of Comparative Example 2. FIG. 9(b) is an exploded schematic side view of the backlight unit 800.

The backlight unit 800 has the same configuration as the backlight unit 100 except that the backlight unit 800 includes a chassis 810 that is formed of an aluminum base which does not undergo anodization. In the backlight unit 800, to prevent electrical conduction between the chassis 810 and LEDs 820, the LEDs 820 are provided on the front surface 810a of the chassis 810 via insulating sheets 850. Note that the thickness of a natural oxide film at the surface of the aluminum base is about several nanometers to about several tens of nanometers.

The present inventor prepared models of the backlight units 100, 700, and 800, each including one LED substrate 122, 722, 822 and a chassis 110, 710, 810 of a size corresponding to the LED substrate, and measured the temperature at a plurality of positions in the samples with the LEDs 120, 720, 820 being switched on. Hereinafter, the results of the measurement are described. Note that the principal surface of the chassis 110, 710, 810 of the models had the size of about 10 cm in length by about 30 cm in width.

In the first place, these models are described. FIG. 10(a) is a schematic front view of the model of the backlight unit 100. FIG. 10(b) is a top view of the model of the backlight unit 100. Note that, herein, in the backlight unit 100 also, the LEDs 120 are attached to the front surface 110a of the chassis 110 via the insulating sheets 150 as in the backlight units 700 and 800. Also, the outer frame of the model is covered with styrene foam instead of the cover member, and its surface is provided with a H2K sheet as the lens sheet. The H2K sheet may be replaced by a BEF. Note that the models of the backlight units 700 and 800 are prepared in the same way as the backlight unit 100 except that the chassis 710 and 810 are different.

Now, the heat emission rate of the respective materials is discussed. As described above, the heat emission rate of SECC is less than 0.1, which is extremely low. The heat emission rate of pure aluminum is 0.03, and the average emissivity of common aluminum is 0.14, which are also low values. On the other hand, the average emissivity of the chassis 110 is about 0.78, which is a high value, although it depends on the thickness of the porous alumina layer 114. Note that the heat emission rate of aluminum oxide is 0.85.

The heat conductivity of the respective materials is also discussed. As described above, the heat conductivity of SECC is 53 W/mk. The heat conductivity of pure aluminum is 236 W/mK, which is a high value, but it does not have sufficient strength. Note that the heat conductivity of common alumina is 29 W/mK. On the other hand, the heat conductivity of the aluminum base 112 is 120 W/mK.

Hereinafter, the equilibrium temperature of the models of the backlight units 100, 700, and 800 is described with reference to FIG. 11. It should be noted that, herein, comparison of the equilibrium temperatures of the backlight units 100, 700, and 800 under the same conditions at the same position is important, but the absolute values of the equilibrium temperatures are not important. Specifically, herein, the equilibrium temperatures in the models of the backlight units 100, 700, and 800 which have a small size and which produce a small quantity of heat are compared. The difference between the equilibrium temperatures of the models of the backlight units 100, 700, and 800 is smaller than the difference between the actual equilibrium temperatures of the backlight units 100, 700, and 800.

Figure 10:
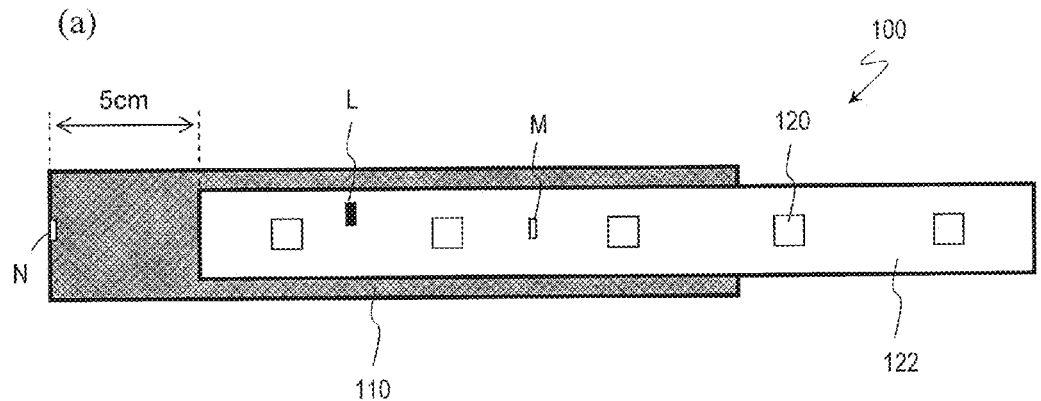
FIG. 10 (a) is a schematic front view showing a model of the backlight unit shown in FIG. 1. (b) is an exploded schematic top view of (a).
Figure 10:
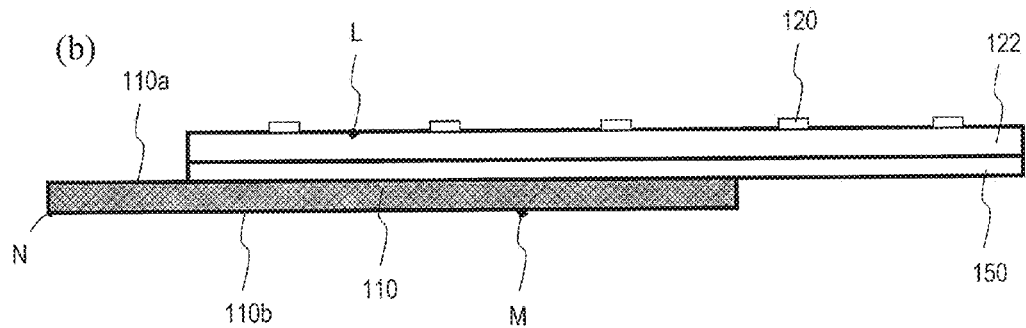

FIG. 11(a) shows the equilibrium temperatures of the LED substrates 122, 722, and 822 of the backlight units 100, 700, and 800. In FIG. 10, the position of measurement is shown as "L".

Among the backlight units 100, 700, and 800, the equilibrium temperature of the backlight unit 700 is the highest. This is probably because the chassis 710 is formed of SECC that has a relatively low heat emission rate, and the heat produced in the LED substrate 722 is unlikely to be released via the insulating sheets 750 and the chassis 710. The equilibrium temperature of the backlight unit 100 is the lowest. This is probably because the surfaces of the chassis 110 are formed by the porous alumina layers 114a that have a relatively high heat emission rate so that the heat produced in the LED substrates 122 is likely to be released via the insulating sheets 150 and the chassis 110. Thus, it is inferred that the equilibrium temperature varies mainly depending on the heat emission rate of the chassis 110, 710, 810.

FIG. 11(b) is a graph showing the temperatures of regions of the rear surfaces 110b, 710b, and 810b of the chassis 110, 710, and 810 which overlap the LED substrates 122, 722, and 822. In FIG. 10, this position of measurement is shown as "M".

Among the backlight units 100, 700, and 800, the equilibrium temperature of the backlight unit 700 is the highest, while the equilibrium temperature of the backlight unit 100 is the lowest. As described above, it is inferred that the equilibrium temperature varies mainly depending on the heat emission rate of the chassis 110, 710, 810.

FIG. 11(c) is a graph showing the temperatures of regions of the rear surfaces 110b, 710b, and 810b of the chassis 110, 710, and 810 which do not overlap the LED substrates 122, 722, and 822. In FIG. 10, this position of measurement is shown as "N". Note that the position N is distant by 5 cm from a corresponding edge of the LED substrate 122, 722, 822.

Among the backlight units 100, 700, and 800, the equilibrium temperature of the backlight unit 800 is the highest. The chassis 810 is made of aluminum that has relatively high heat conductivity and relatively low heat emission rate. The heat produced in the LED substrate 822 moves via insulating sheets 850 and the chassis 810, while the heat is unlikely to be released from the chassis 810. The equilibrium temperature of the backlight unit 100 is the lowest. This is probably because the chassis 110 not only includes the aluminum base 112 in the inner part but also includes the porous alumina layers 114a at the surfaces, so that the heat produced in the LED substrates 122 moves via the insulating sheets 150 and the chassis 110 and is therefore likely to be released from the chassis 110.

As appreciated from the above, in the backlight unit 100 of the present embodiment, the temperature can be decreased as compared with the backlight units 700 and 800 of Comparative Examples 1 and 2. Thus, the operation stability can be further secured.

Figure 11:
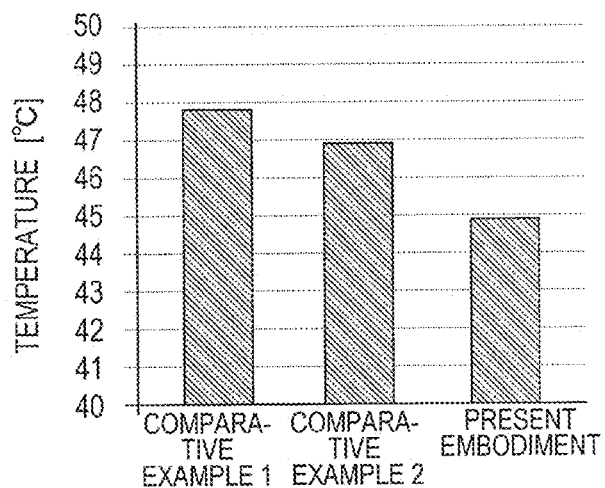
FIGS. 11 (a), (b) and (c) are graphs showing the equilibrium temperatures of the models of the backlight units of Comparative Example 1, Comparative Example 2 and the first embodiment, respectively.
Figure 11:
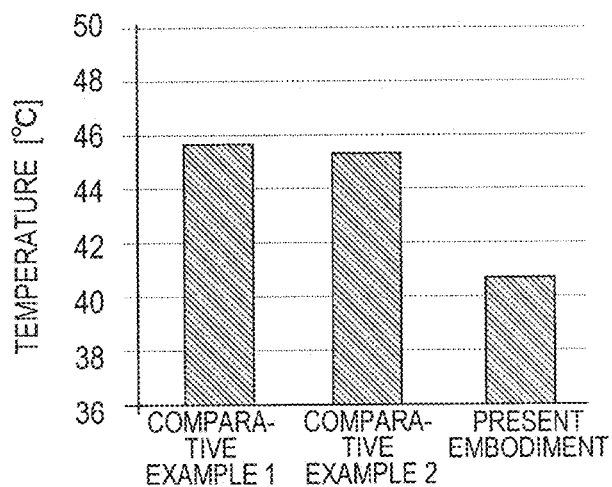
Figure 11:
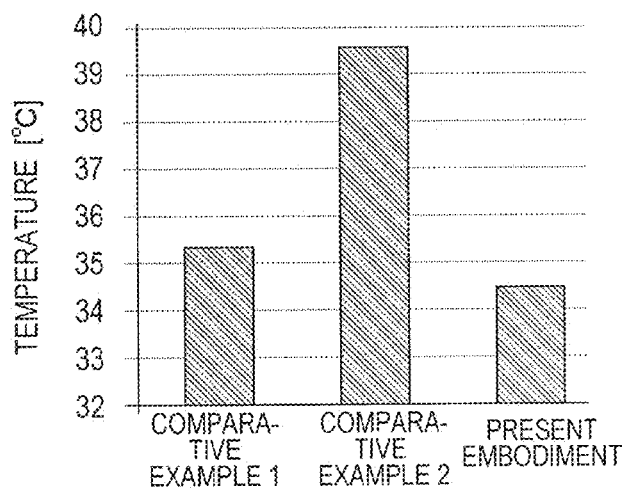

In the description which has been provided with reference to FIG. 11, the backlight unit 100 is provided with the insulating sheets 150 for the purpose of making comparison under the same conditions. The insulating sheets 150 may not be provided in the backlight unit 100 because the surfaces of the chassis 110 are provided with the porous alumina layers 114a and the chassis 110 itself exhibits a high insulation property. When the insulating sheets 150 are not provided, the temperature of the backlight unit 100 can be further decreased.

Figure 12:
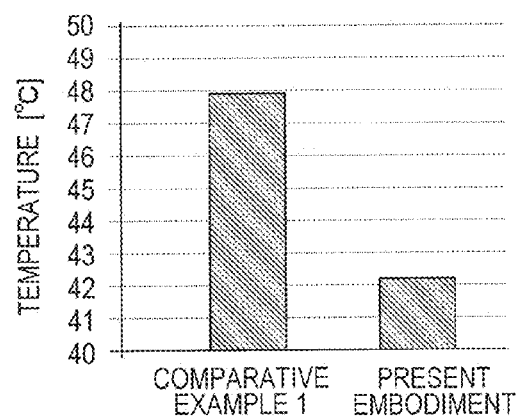
FIG. 12 A graph showing the equilibrium temperatures of the models of the backlight units of Comparative Example 1 and the first embodiment.

For example, when the backlight unit 100 does not include the insulating sheets 150, the temperature of the LED substrates 122 is 42.2° C. as shown in FIG. 12. Thus, in the backlight unit 100, due to the absence of the insulating sheets 150, the equilibrium temperature of the LED substrates 122 can be further decreased as compared with the backlight unit 700. Also, such absence of the insulating sheets 150 enables to omit the cost of the insulating sheets 150. Note that, as will be described later, in the backlight unit 100, the rear surface 110b of the chassis 110 may be provided with a fan.

Embodiment 2

In the above description, the anodization is performed on the aluminum base, although the present invention is not limited to this example. The same effects can be achieved without the use of the aluminum base, by forming an aluminum layer by means of evaporation or the like, and thereafter performing the anodization on the aluminum layer. Note that, in this case, to improve the adhesion between the base and the aluminum layer, it is preferred to deposit an inorganic underlayer and a buffer layer together.

For example, it is preferred to form a titanium oxide layer and a silicon oxide layer as the inorganic underlayer. The buffer layer contains aluminum and either of oxygen or nitrogen. The content of aluminum in the buffer layer is preferably varied such that the aluminum content is higher in part of the buffer layer which is on the aluminum layer side than in the inorganic underlayer.

Figure 13:
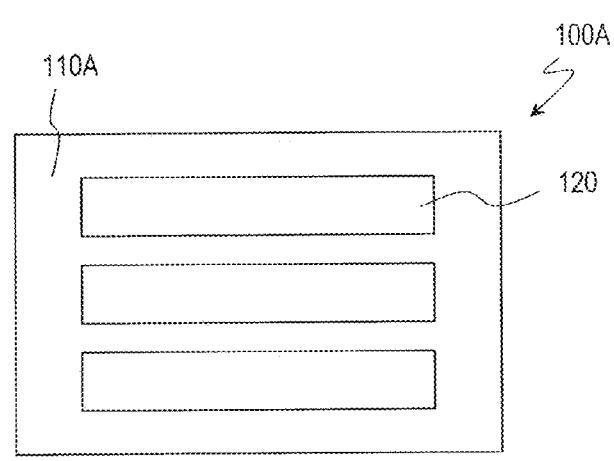
FIG. 13 (a) is a schematic diagram of the second embodiment of the backlight unit of the present invention. (b) is a schematic cross-sectional view of a chassis in (a).
Figure 13:
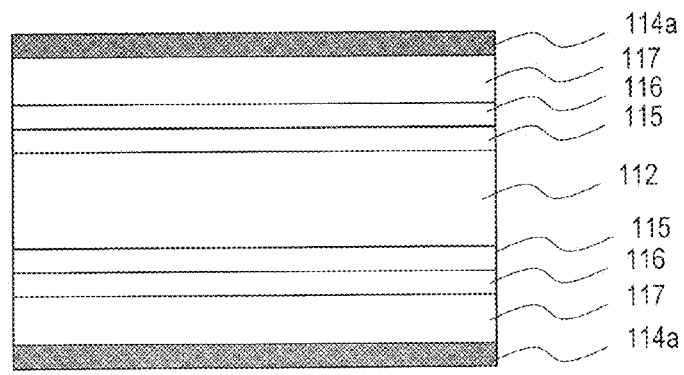

Hereinafter, the second embodiment of the backlight unit of the present invention is described with reference to FIG. 13. The backlight unit 100A of the present embodiment has the same configuration as that of the backlight unit that has previously been described with reference to Embodiment 1 except for the structure of the chassis. To avoid redundancy, repetitive description is omitted.

FIG. 13(a) is a schematic diagram of the backlight unit 100A of the present embodiment. FIG. 13(b) is a schematic cross-sectional view of the chassis 110A in the backlight unit 100A. The chassis 110A further includes inorganic underlayers 115, buffer layers 116, and aluminum layers 117 between the base 112 and the porous alumina layers 114a. For example, the base 112 used may be a glass base or a plastic film. Specifically, the plastic film used may be a polyethylene terephthalate (PET) film or a triacetylcellulose (TAC) film. Alternatively, the base 112 used may be SECC.

The inorganic underlayer 115 is provided on the surface of the base 112. The buffer layer 116 is provided on the inorganic underlayer 115. The aluminum layer 117 is provided on the surface of the buffer layer 116. The porous alumina layer 114a is formed by performing the anodization (and, when necessary, the etching process) and the pore sealing process on the aluminum layer 117. When a conductive layer is provided as a backing for uniformly performing the anodization on the aluminum layer 117, it is preferred that the conductive layer (preferably, a valve metal layer) is provided between the inorganic underlayer 115 and the buffer layer 116 or between the buffer layer 116 and the aluminum layer 117.

When the base 112 used is a glass base, the inorganic underlayer 115 is directly formed on the surface of the base 112 and has the function of preventing an alkaline metal element contained in the base 112 from dissolving out of the base 112. In view of the adhesion with the base 112, the inorganic underlayer 115 is preferably made of an inorganic oxide or an inorganic nitride. When an inorganic oxide is used, for example, the inorganic underlayer 115 is preferably a silicon oxide layer or a titanium oxide layer. When an inorganic nitride is used, for example, the inorganic underlayer 115 is preferably a silicon nitride layer. It is also preferred that the thermal expansion coefficient of the inorganic underlayer 115 is adapted by adding an impurity to the inorganic oxide layer or inorganic nitride layer. For example, when a silicon oxide layer is used, the thermal expansion coefficient can be increased by adding germanium (Ge) phosphorus (P), or boron (B). When 5 mass % Ge is added to the silicon oxide, for example, the thermal expansion coefficient is about $2.8 \times 10^{-6}/°$ C., which is about three times that obtained when Ge is not added.

The thickness of the inorganic underlayer 115 is preferably not less than 40 nm and, more preferably, not less than 100 nm. The thickness of the inorganic underlayer 115 is preferably not more than 500 nm and, more preferably, not more than 200 nm. If the thickness of the inorganic underlayer 115 is more than 500 nm, the time required for formation of the inorganic underlayer 115 will be unduly long. Also, the adhesion between the base 112 and the inorganic underlayer 115 may deteriorate due to thermal stress (shear stress) which is attributed to the difference in thermal expansion coefficient between the base 112 and the inorganic underlayer 115. In the case where a flexible base such as a plastic film is used as the base 112, if the thickness of the inorganic underlayer 115 is more than 500 nm, a crack may be formed in the inorganic underlayer 115 when the base is bent.

The buffer layer 116 is provided between the inorganic underlayer 115 and the aluminum layer 117. The buffer layer 116 has the function of improving the adhesion between the inorganic underlayer 115 and the aluminum layer 117. The buffer layer 116 is made of a material which has excellent acid resistance and protects the inorganic underlayer 115 from acid.

The buffer layer 116 preferably contains aluminum and either of oxygen or nitrogen. The buffer layer 116 preferably has such a profile that the aluminum content is higher in a portion which is closer to the aluminum layer 117 than in another portion which is closer to the inorganic underlayer 115, although the oxygen or nitrogen content may be uniform. This is because the property values, such as the thermal expansion coefficient, exhibit excellent conformity. The thickness of the buffer layer 116 is preferably not less than 40 nm and, more preferably, not less than 100 nm. The thickness of the buffer layer 116 is preferably not more than 500 nm and, more preferably, not more than 200 nm. If the thickness of the buffer layer 116 is less than 40 nm, it is difficult to sufficiently protect the inorganic underlayer 115 from a treatment solution permeating from the aluminum layer 117 side (the electrolytic solution in the anodization step and/or the etching solution in the etching step) so that the effects of provision of the buffer layer 116 sometimes cannot be sufficiently produced. If the thickness of the buffer layer 116 is more than 500 nm, the time required for formation of the buffer layer 116 will be unduly long.

The profile of the aluminum content in the buffer layer 116 along the thickness direction may vary stepwise or may continuously vary. For example, when the buffer layer 116 is formed of aluminum and oxygen, a plurality of aluminum oxide layers which have gradually decreasing oxygen contents are formed, and then, the aluminum layer 117 is formed on the uppermost aluminum oxide layer. This process also applies to a case where the buffer layer 116 is formed of aluminum and nitrogen.

The aluminum layer 117 may be formed using a known method (e.g., electron beam deposition or sputtering). The aluminum layer 117 is formed by sputtering using, for example, an aluminum target with a purity of 99.99 mass % or higher. The thickness of the aluminum layer 117 is, for example, 1000 nm (1 µm). Here, the aluminum layer 117 having a thickness of about 1 µm is preferably formed through a plurality of separate cycles rather than formed at once in one cycle. Specifically, it is preferred to repeat the cycle of depositing aluminum to a certain thickness before an intermission of a certain time period and resuming the deposition after the intermission till the aluminum layer 117 having a predetermined thickness (e.g., 1 µm) is obtained, rather than to continuously deposit aluminum to the predetermined thickness. For example, it is preferred that the aluminum layer 117 having a thickness of about 1 µm is obtained by forming 20 aluminum layers each of which has a thickness of 50 nm in such a manner that every formation of the 50 nm thick aluminum layer is followed by an intermission. In this way, the deposition of aluminum is carried out in a plurality of separate cycles, whereby the quality of the finally-obtained aluminum layer 117 (e.g., the chemical resistance or adhesion) can be improved. This is probably because continuous deposition of aluminum increases the temperature of a base (a base having a surface on which the aluminum layer is to be formed), and as a result, the distribution of thermal stress in the aluminum layer 117 becomes nonuniform so that the film quality deteriorates.

In the above description, the aluminum layer 117 and the porous alumina layer 114a are provided on each of the front surface 110a and the rear surface 110b of the chassis 110A, although the present invention is not limited to this example. The aluminum layer 117 and the porous alumina layer 114a may be provided only on either of the front surface 110a or the rear surface 110b of the chassis 110A.

Embodiment 3

The thickness of the above-described porous alumina layer is generally uniform, although the present invention is not limited to this example. The thickness of the porous alumina layer may vary depending on the position.

Figure 14:
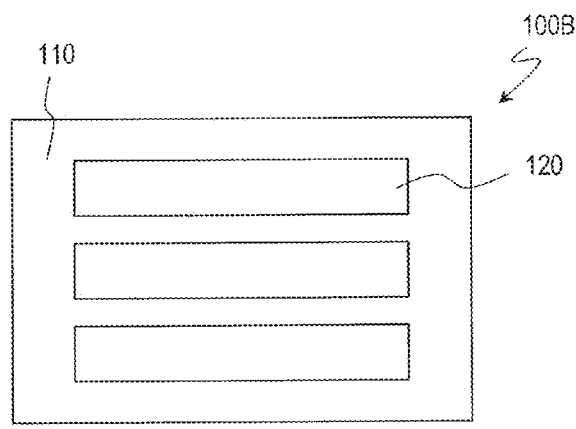
FIG. 14 (a) is a schematic diagram of the third embodiment of the backlight unit of the present invention. (b) and (c) are exploded schematic perspective views of a chassis in (a). (d) is a schematic cross-sectional view of the chassis in (a).
Figure 14:
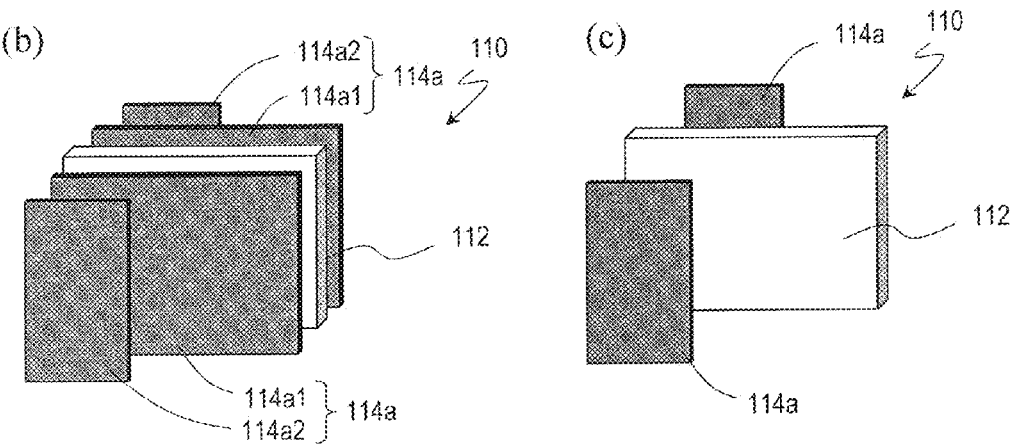
Figure 14:
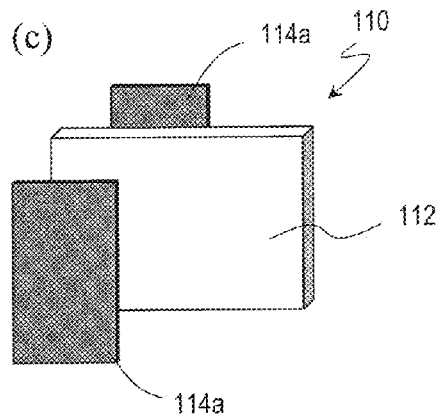
Figure 14:
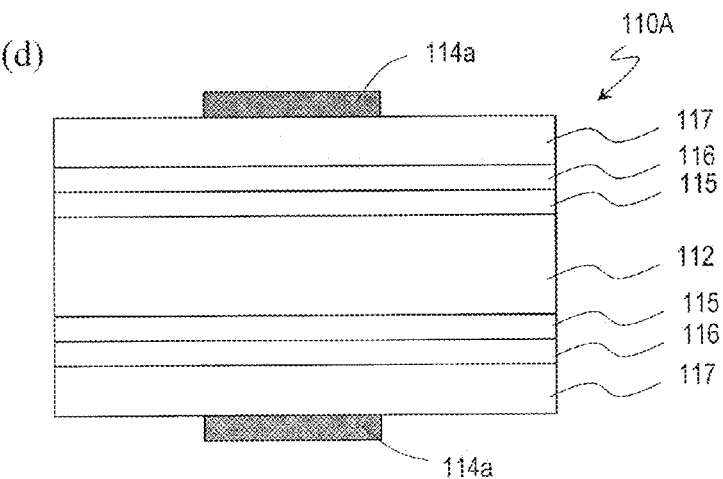

Hereinafter, the third embodiment of a backlight unit 100B of the present invention is described with reference to FIG. 14. The backlight unit 100B of the present embodiment has the same configuration as that of the backlight unit that has previously been described with reference to Embodiments 1 and 2 except that the thickness of the porous alumina layer in the chassis 110 is not uniform. To avoid redundancy, repetitive description is omitted.

FIG. 14(a) is a schematic diagram of the backlight unit 100B of the present embodiment. FIG. 14(b) is an exploded schematic perspective view of the chassis 110. The chassis 110 includes an aluminum base 112 and porous alumina layers 114a which have a varying thickness as previously described with reference to FIG. 1(b). For example, an anodization is performed with the entirety of the aluminum base 112 being immersed in an electrolytic solution, whereby porous alumina layers 114a1 are formed, and thereafter, another anodization is performed with only part of the aluminum base 112 being immersed in the electrolytic solution, without immersing the remaining part in the electrolytic solution, whereby porous alumina layers 114a2 are formed. And, at the end, a pore sealing process is performed. In this way, the porous alumina layers 114a which have a varying thickness may be formed. Note that the anodization increases the volume of the porous alumina layers due to expansion, and therefore, the thickness of the porous alumina layer 114a2 for which the total immersion duration is long is greater than the thickness of the porous alumina layer 114a1 for which the total immersion duration is short.

In the chassis 110 shown in FIG. 14(b), the porous alumina layers 114a which have a varying thickness are provided on the surfaces of the aluminum base 112, although the present invention is not limited to this example. A porous alumina layer may be provided in a region of the aluminum base, while the other region is not provided with a porous alumina layer.

FIG. 14(c) is an exploded schematic perspective view of another chassis 110. In this chassis 110, the porous alumina layers 114a are provided only one side of the aluminum base 112 (here, the left side on the sheet of the drawing), while on the other side the porous alumina layers are not provided. Such porous alumina layers 114a may be formed by performing the anodization with only part of the aluminum base 112 being immersed in an electrolytic solution, without immersing the remaining part in the electrolytic solution.

In FIG. 14(b) and FIG. 14(c), the anodization is partially performed on the aluminum base 112, although the present invention is not limited to this example.

For example, the anodization may be partially performed by immersing the aluminum base 112 or the aluminum layers 117 in an electrolytic solution in such a masking state that part of the surfaces of the aluminum base 112 or the aluminum layers 117 is covered with a protection film. The protection film used may be, for example, a film which has excellent acid resistance. Alternatively, the anodization is performed with a low heat conduction member that is made of a low heat conduction material being partially provided on one of the principal surfaces of a support which is opposite to the other principal surface on which the aluminum layer is provided, so that the temperature of a region of the aluminum layer corresponding to the low heat conduction member is higher than that of the other region, and the anodization can advance faster in the region corresponding to the low heat conduction member. The entirety of the disclosures of Japanese Patent Application No. 2010-052304 is incorporated by reference in this specification.

FIG. 14(d) is a schematic cross-sectional view of the chassis 110A. The chassis 110A includes the base 112, the porous alumina layers 114a, the inorganic underlayers 115, the buffer layers 116, and the aluminum layers 117 as previously described with reference to FIG. 13. By performing the anodization only on part of the aluminum layers 117, the porous alumina layers 114a can be partially formed. Although in FIG. 14(d) the porous alumina layers 114a are provided partially on the surfaces of the aluminum layers 117, the porous alumina layers 114a which have a varying thickness may be provided over the entire surfaces of the aluminum layers 117 as shown in FIG. 14(b).

As described above, in the chassis 110 and 110A, the thickness of the porous alumina layers 114a is increased particularly in a region where the heat radiation characteristics are necessary, whereby the heat emission characteristics can be improved. Further, by partially providing the porous alumina layers 114a, the surface area of the porous alumina layers 114a can be increased, and the heat radiation characteristics can be improved.

Embodiment 4

In the description provided above, the anodization and the pore sealing process are performed on an aluminum base or aluminum layer, although the present invention is not limited to this example.

Figure 15:
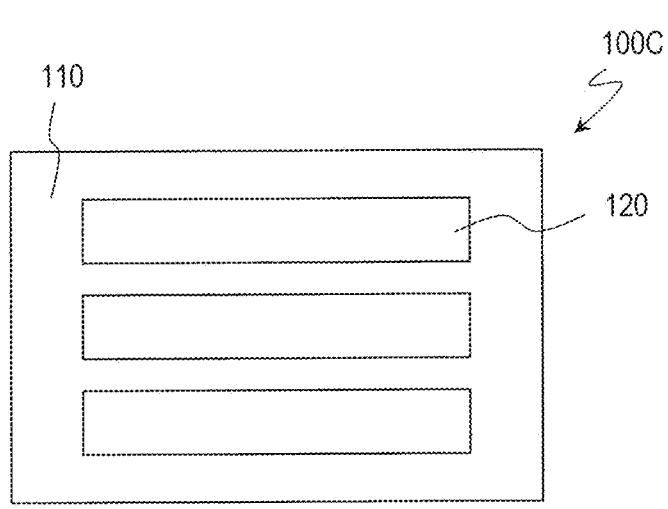
FIG. 15 (a) is a schematic diagram of the fourth embodiment of the backlight unit of the present invention. (b) is an exploded schematic perspective view of a chassis in (a).
Figure 15:
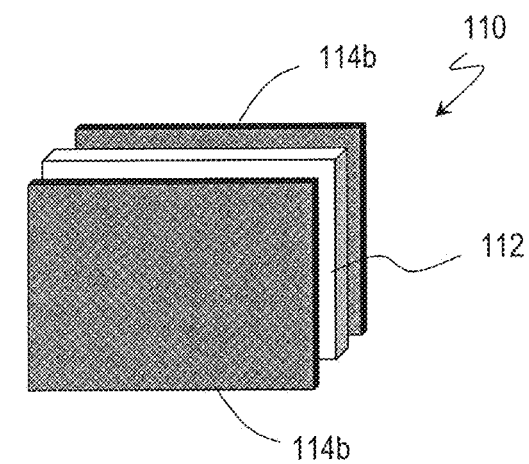

Hereinafter, the fourth embodiment of the backlight unit of the present invention is described with reference to FIG. 15. A backlight unit 100C of the present embodiment has the same configuration as those of the backlight units of Embodiments 1 to 3 that have been previously described, except that the porous alumina layer does not undergo the pore sealing process. To avoid redundancy, repetitive description is omitted.

FIG. 15(a) is a schematic diagram of the backlight unit 100C. FIG. 15(b) is an exploded perspective view of the chassis 110. In the backlight unit 100C, the chassis 110 includes the aluminum base 112 and porous alumina layers 114b. Here, the porous alumina layers 114b are formed by performing the anodization on the aluminum base 112, and the pore sealing process is not performed.

As described above, micropores are formed after the anodization. By omitting the pore sealing process, the heat releasing effect can be improved by utilization of a relatively large surface area of the porous alumina layers 114b. Particularly, by forming micropores with a small pore diameter over the entire surfaces of the porous alumina layers 114b, the surface area is larger than that of a porous alumina layer which is formed by common anodization, and the area which is in contact with the air increases. Therefore, the heat releasing effect which is achieved by thermal convection can be increased. For example, it is preferred that porous alumina layers 114b for use as a mold (stamper) for a so-called antireflection element are formed as the porous alumina layers 114b, and a plurality of recessed portions whose two-dimensional size viewed in a direction normal to the surface is not less than 10 nm and less than 500 nm are formed in the porous alumina layer 114b. Note that, strictly speaking, even when the pore sealing process is not performed, oxidation slightly advances because of air.

Recessed portions which have different sizes may be formed in the porous alumina layers 114b. For example, the recessed portions which have different sizes can be formed by performing the anodization and the etching process on an aluminum base which contains at least one element selected from the group consisting of Mn, Mg, and Fe. Alternatively, the recessed portions which have different sizes can be formed by performing cathode electrolysis before the anodization.

The porous alumina layers 114b having the above-described configuration are formed as described below, for example.

Figure 16:
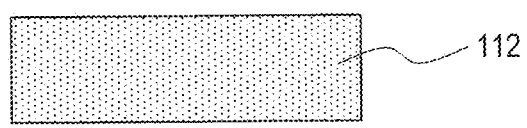
FIG. 16 (a) to (c) are schematic diagrams for illustrating a manufacturing method of a chassis of the backlight unit shown in FIG. 15.
Figure 16:
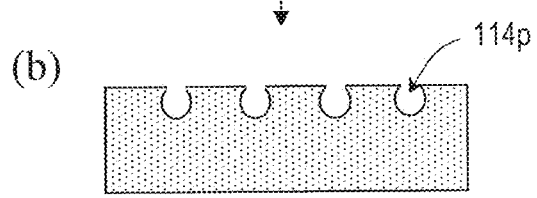
Figure 16:
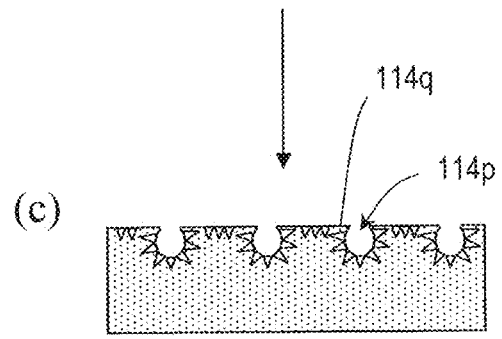

Hereinafter, a method for forming the porous alumina layer 114b is described with reference to FIG. 16. First, an aluminum base 112 whose aluminum (Al) content is not more than 99.0 mass % is provided as shown in FIG. 16(a). Here, the aluminum base 112 preferably contains at least one element selected from the group consisting of Mn, Mg, and Fe. The total content of these elements is preferably 1 mass % or more. Note that the aluminum base 112 may further contain Si.

Then, as shown in FIG. 16(b), surface part of the aluminum base 112 is anodized to form a porous alumina layer. The porous alumina layer has a plurality of recessed portions. Then, the porous alumina layer is brought into contact with an alumina etchant to enlarge the plurality of minute recessed portions of the porous alumina layer, whereby recessed portions (micropores) 114p are formed. The recessed portions 114p are formed when the aluminum base 112 is 99.0 mass % or less, especially when the aluminum base 112 contains at least one element selected from the group consisting of Mn, Mg, and Fe. When the aluminum purity of the aluminum base 112 exceeds 99.0 mass %, the number of the recessed portions 114p decreases. When the aluminum purity exceeds 99.5 mass %, the number of the recessed portions 114p further decreases. Note that the recessed portions 114p are formed in the first etching step of the porous alumina layer, and in the two or more subsequent etching steps, the number and size of the recessed portions 114p scarcely change. The distribution of the recessed portions 114p is irregular.

Thereafter, the above-described anodization step and etching step are alternately performed two or more times such that a plurality of minute recessed portions 114p, each of which has a stepped lateral surface, are formed in the porous alumina layer. The minute recessed portions 114p are formed across the entire surface of the aluminum base 112, including the inner surface of the recessed portions 114p. The porous alumina layer 114b is formed in this way.

For example, the size, formation density, depth, etc., of the recessed portions 114p can be controlled by changing the conditions of the anodization (for example, the forming voltage, the type and concentration of the electrolytic solution, as well as the duration of anodization). Also, the regularity of arrangement of the recessed portions 114p can be controlled by controlling the level of the forming voltage. For example, the conditions for obtaining an arrangement with high regularity are: (1) using an appropriate constant voltage inherent to the electrolytic solution in the anodization; and (2) conducting the anodization for a long time period. Known combinations of the electrolytic solution and the forming voltage which meet the above conditions are 28 V for sulfuric acid, 40 V for oxalic acid, and 195 V for phosphoric acid. To form the recessed portions 114p in an irregular arrangement, the etching step and the anodization step are alternately repeated under the above condition (1) while the duration of the anodization is however decreased as short as possible. Formation of such porous alumina layer 114b is disclosed in, for example, WO 2009/147858. In this specification, the disclosures of WO 2009/147858 are incorporated by reference.

Figure 17:
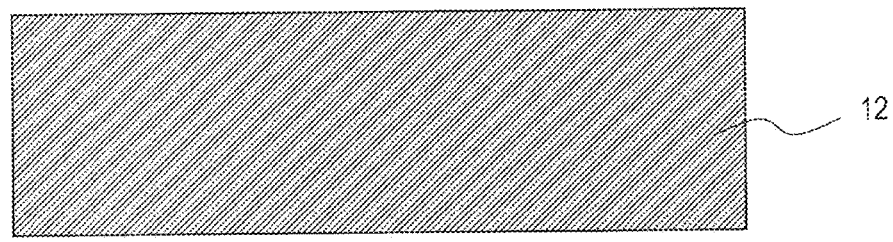
FIG. 17 (a) to (c) are schematic diagrams for illustrating a manufacturing method of another chassis of the backlight unit shown in FIG. 15.
Figure 17:
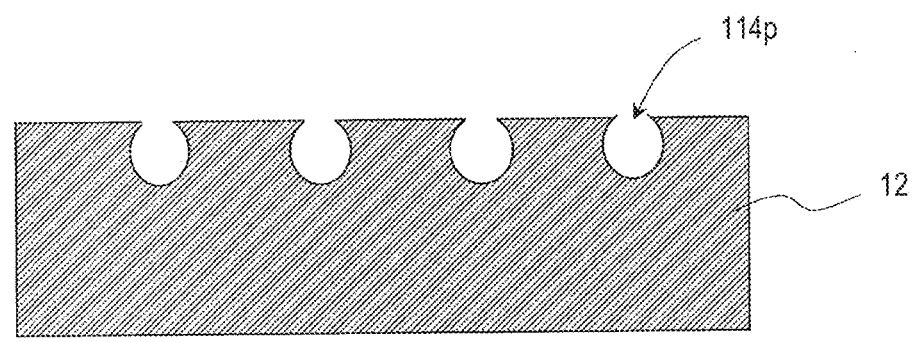
Figure 17:
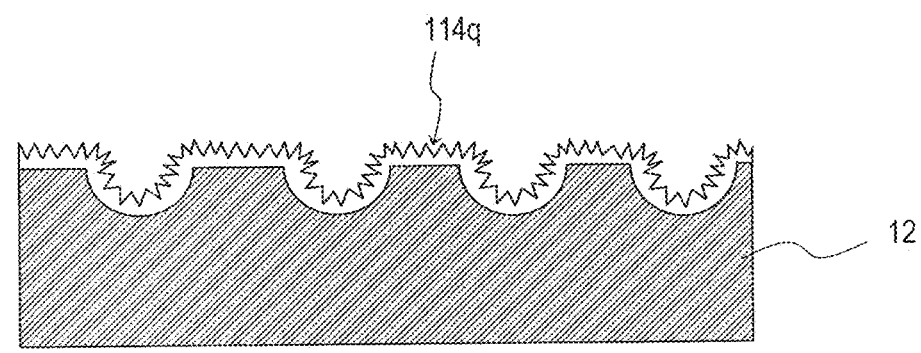

The porous alumina layer 114b that has recessed portions (micropores) of different sizes can also be formed by still another method. Hereinafter, the method for forming the porous alumina layer 114b is described with reference to FIG. 17.

First, an aluminum base 112 is provided as shown in FIG. 17(a). The aluminum base 112 may have a damaged layer. Alternatively, instead of the aluminum base 112, an aluminum layer 117 (see FIG. 13(b)) with a thickness of about 0.5 µm to 5 µm, for example, which is supported on a base, such as a glass substrate, for example, may be used.

Then, an electric current is allowed to pass between a surface of the aluminum base 112 or the aluminum layers 117 and a counter electrode in an aqueous solution with the surface being a cathode, whereby a plurality of recessed portions (first recessed portions) 114p whose two-dimensional size viewed in a direction normal to the surface is not less than 200 nm and not more than 100 µm are formed as shown in FIG. 17(b). The aqueous solution (electrolytic solution) may be an electrolytic solution which is prepared for anodization or may be water whose resistance value is not more than 1 M. The solution temperature is not limited to any particular value. By adjusting the duration of the cathode electrolysis with the electric current being in the range of about 1 to 100 A/dm$^3$, for example, recessed portions 114p whose two-dimensional size is not less than 200 nm and not more than 100 µm can be formed.

By adjusting the conditions for the cathode electrolysis, a minute uneven structure whose two-dimensional size is about several tens of nanometers can be formed as described above, or the recessed portions 114p whose two-dimensional size is not less than 200 nm and not more than 100 µm can also be formed. The average neighboring distance of the recessed portions 114p may vary depending on the conditions for the cathode electrolysis. However, the average neighboring distance of the recessed portions 114p is preferably not less than 0.5 µm and not more than 100 µm.

Then, the surface is anodized, whereby a porous alumina layer which has a plurality of minute recessed portions (second recessed portions) 114q whose two-dimensional size viewed in a direction normal to the surface is not less than 10 nm and less than 500 nm is formed over the inner surfaces of the plurality of recessed portions 114p and between the plurality of recessed portions 114p as shown in FIG. 17(c). Thereafter, the porous alumina layer is brought into contact with an etching solution, whereby the plurality of minute recessed portions 114q are enlarged. As described above, by alternately repeating the anodization step and the etching step through a plurality of cycles, the porous alumina layer that has the minute recessed portions 114q which have a desired cross-sectional shape can be formed. The pore diameter of the minute recessed portions 114q is preferably increased by etching (so as to have a generally conical cross-sectional shape) such that the two-dimensional size (diameter) of the minute recessed portions 114q is generally equal to the neighboring distance, for example, not less than 10 nm and less than 500 nm. The minute recessed portions 114q are formed so as to be superposed over the recessed portions 114p whose two-dimensional size is not less than 200 nm and not more than 100 µm. In this way, the porous alumina layer 114b is formed. Formation of such a porous alumina layer is disclosed in, for example, Japanese Patent Application No. 2009-255534. In this specification, the disclosures of Japanese Patent Application No. 2009-255534 are incorporated by reference.

Although repetitive description is omitted in order to avoid redundancy, the porous alumina layers 114a in the above-described backlight units 100, 100 of Embodiments 1 to 3 may be replaced by the porous alumina layers 114b that does not undergo the pore sealing process.

Embodiment 5

Figure 18:
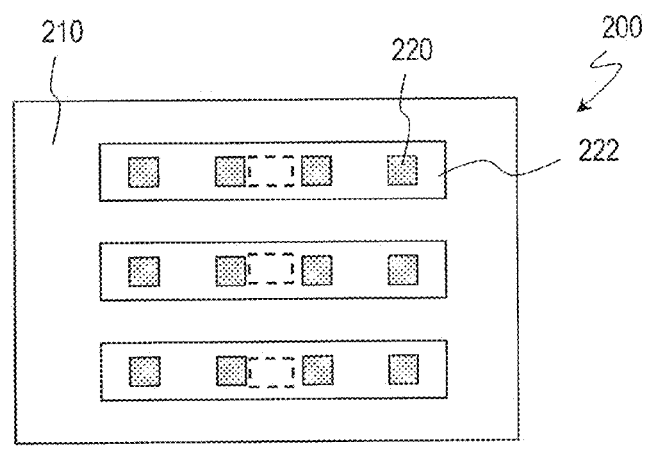
FIG. 18 (a) is a schematic front view of the fifth embodiment of the backlight unit of the present invention. (b) is an exploded side view of the backlight unit shown in (a). (c) is a schematic rear view of the backlight unit shown in (a).
Figure 18:
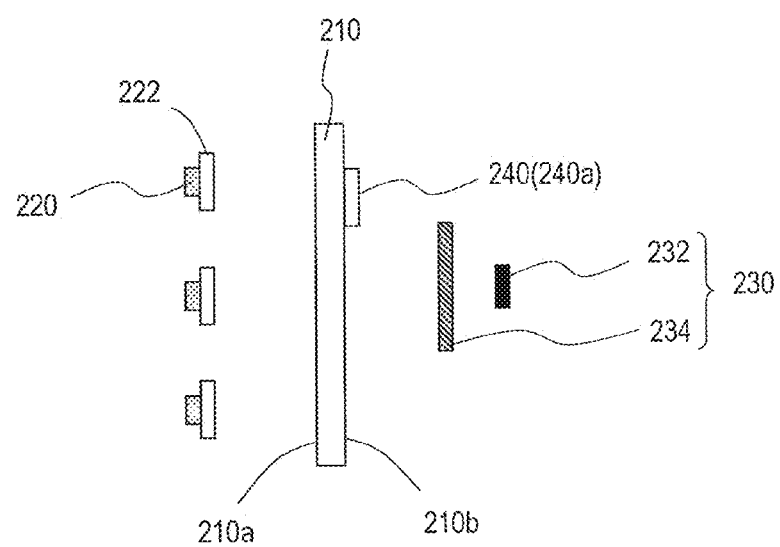
Figure 18:
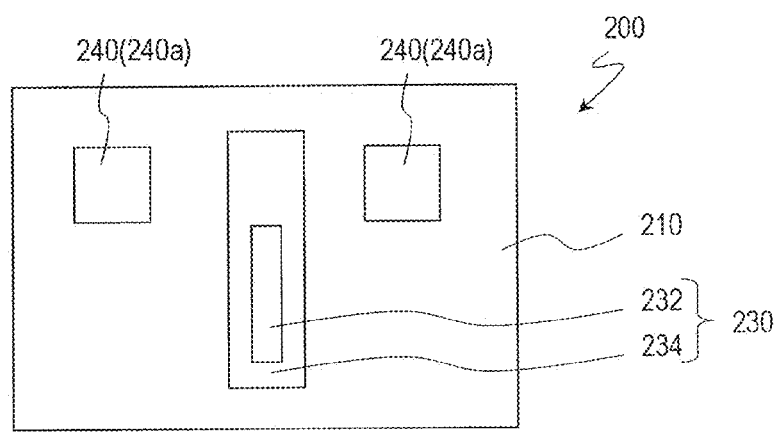

Hereinafter, the fifth embodiment of the backlight unit of the present invention is described. First, a backlight unit 200 of the present embodiment is described with reference to FIG. 18. FIG. 18(a) is a schematic front view of the backlight unit 200. FIG. 18(b) is an exploded schematic side view of the backlight unit 200. FIG. 18(c) is a schematic rear view of the backlight unit 200.

The backlight unit 200 includes a chassis 210 which has a front surface 210a and a rear surface 210b, LEDs 220 which are provided on the front surface 210a, and fans 240 which are provided on the rear surface 210b. Note that, herein, the LEDs 220 are provided on the front surface 210a of the chassis 210 via LED substrates 222. Further, the rear surface 210b of the chassis 210 is provided with a LED driver section 230. Specifically, the LED driver section 230 includes a LED control circuit 232 and a LED control board 234. The LED control circuit 232 is attached to the rear surface 210b of the chassis 210 via the LED control board 234. Note that, herein, although not shown, in the backlight unit 200, the chassis 210 is covered with a cover member. In the backlight unit 200, two heat exhaust fans 240a are provided as the fans 240. The heat exhaust fans 240a are arranged generally perpendicular to a direction normal to the rear surface 210b of the chassis 210. This arrangement enables to expel the heat of the backlight unit 200. Note that, although two heat exhaust fans 240a are provided herein, the number of heat exhaust fans 240a may be one, and alternatively, the number of heat exhaust fans 240a may be three or more.

As described above, there is a probability that the LEDs and the LED driver section fall in unstable operation due to produced heat. Particularly when the liquid crystal display device is used as a display for digital signage (particularly, a large-size digital signage display for outdoor use), a large electric current flows through the LEDs and the LED driver section so that the operation is likely to be unstable. However, in the backlight unit 200, the heat produced from the LEDs 220 is efficiently expelled to the outside by the heat exhaust fans 240a so that the operation can be stabilized.

Figure 19:
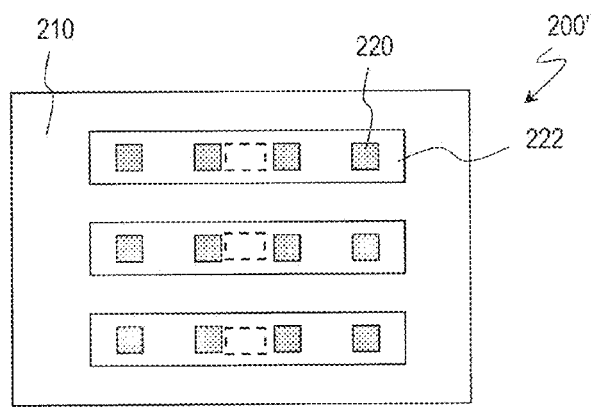
FIG. 19 (a) is a schematic front view of another embodiment of the backlight unit of the present invention. (b) is an exploded side view of the backlight unit shown in (a).
Figure 19:
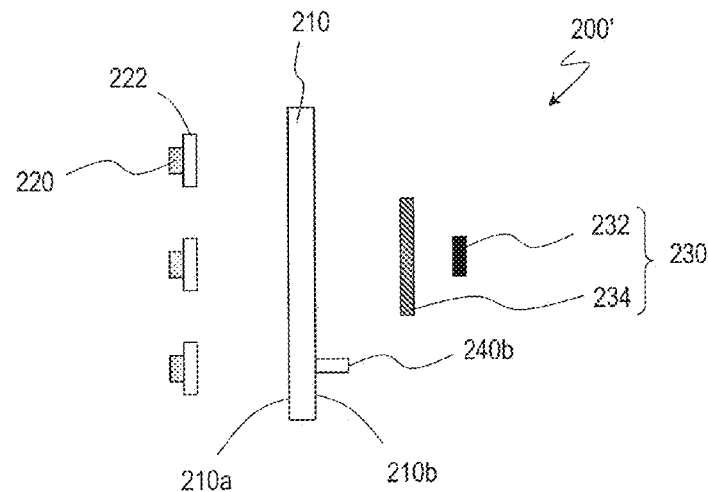

Next, a backlight unit 200' of another embodiment is described with reference to FIG. 19. FIG. 19(a) is a schematic front view of the backlight unit 200'. FIG. 19(b) is an exploded schematic side view of the backlight unit 200'.

The backlight unit 200' has the same configuration as that of the backlight unit 200 which has previously described, except that air supply fans 240b are provided as the fans 240 instead of the heat exhaust fans 240a. To avoid redundancy, repetitive description is omitted.

In the backlight unit 200', the air supply fans 240b are provided as the fans 240. The air supply fans 240b are arranged generally parallel to a direction normal to the rear surface 210b of the chassis 210. This arrangement enables the heat emitted from the rear surface of the backlight unit 200' to move away from the vicinity of the backlight unit 200'. Since in the backlight unit 200' the heat produced form the LEDs 220 and the LED driver section 230 is efficiently sent far away by the air supply fans 240b, the operation can be stable.

In the above-described backlight units, either of the heat exhaust fans or the air supply fans are provided, although the present invention is not limited to this example. The backlight unit may include both the heat exhaust fans and the air supply fans.

Figure 20:
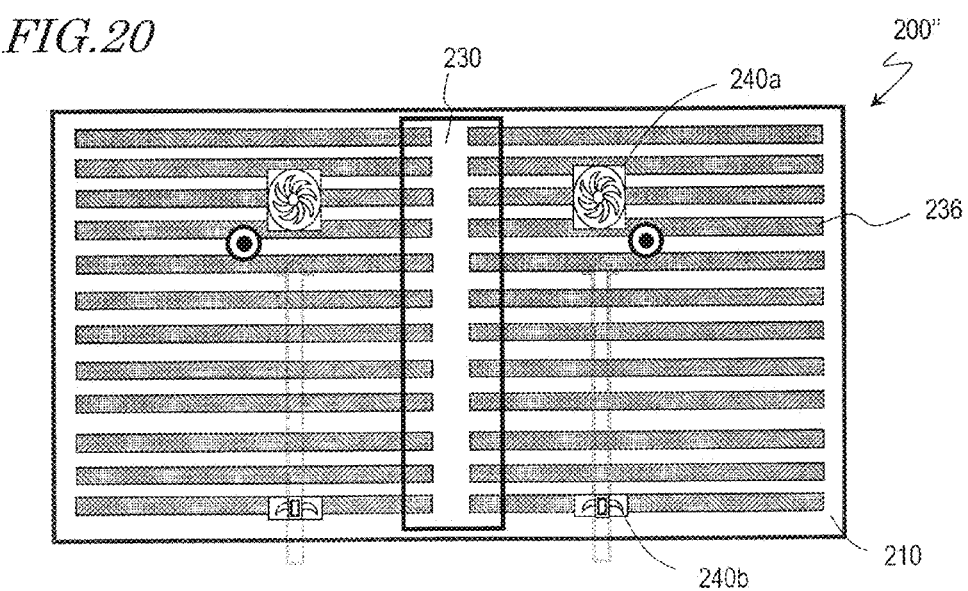
FIG. 20 A schematic rear view of still another embodiment of the backlight unit of the present invention.

FIG. 20 is a schematic rear view of a backlight unit 200" of another embodiment. The LED driver section 230 is provided at the center of the rear surface of the chassis 210. Flexible substrates 236 extend in the left direction or the right direction from the LED driver section 230.

In the backlight unit 200", both the heat exhaust fans 240a and the air supply fans 240b are provided on the rear surface 210b of the chassis 210. Here, two heat exhaust fans 240a are provided. The heat exhaust fans 240a are arranged generally perpendicular to the rear surface 210b of the chassis 210. This arrangement enables to expel the heat inside the backlight unit 200". The air supply fans 240b are arranged generally parallel to a direction normal to the rear surface 210b of the chassis 210. This arrangement enables the heat emitted from the rear surface of the backlight unit 200" (large part of the heat is heat expelled by the heat exhaust fans 240a) to move away from the vicinity of the backlight unit 200". By providing both the heat exhaust fans 240a and the air supply fans 240b in this way, the heat produced from the LEDs 220 and the LED driver section 230 can be efficiently expelled. Thus, the operation stability of the LEDs 220 and the LED driver section 230 can be secured.

In the backlight units 200, 200' and 200" of the present embodiment, the chassis 210 may be formed of SECC. Alternatively, the chassis 210 may be formed of any other material. In the backlight units 200, 200' and 200" of the present embodiment, the chassis 210 may have the above-described porous alumina layer over its surface. For example, the chassis 210 may have a porous alumina layer which is formed by performing the anodization (and, when necessary, the etching process) on an aluminum base or an aluminum layer. Further, a porous alumina layer may be formed over the surface of an aluminum base or an aluminum layer by performing the pore sealing process.

Figure 21:
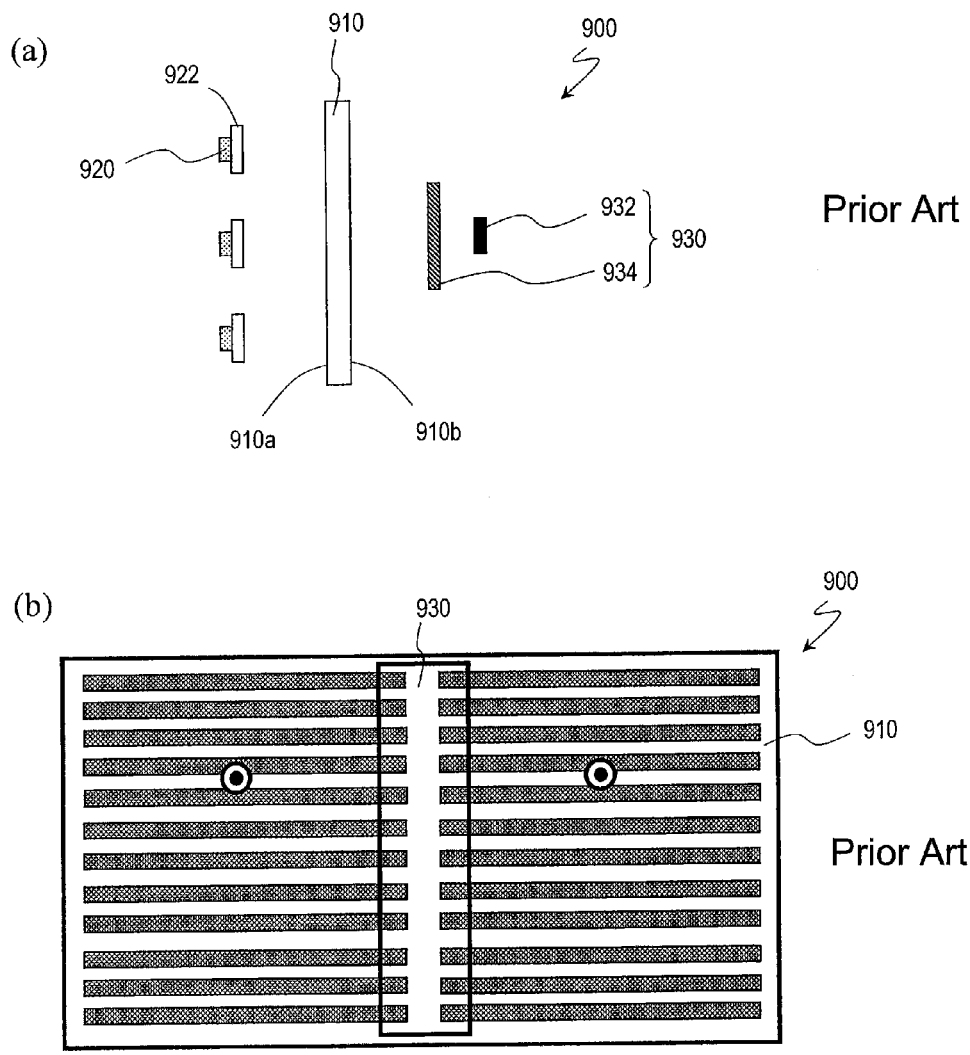
FIG. 21 (a) is an exploded schematic side view of a backlight unit of a reference example. (b) is a schematic rear view of the backlight unit shown in (a).

Here, the advantages of the backlight unit 200 of the present embodiment are described in comparison to the backlight unit of the reference example. First, the backlight unit of the reference example is described with reference to FIG. 21. FIG. 21(a) is a schematic diagram of a backlight unit 900 of the reference example. FIG. 21(b) is a schematic rear view of the backlight unit 900.

The backlight unit 900 has the same configuration as that of the backlight unit 200 shown in FIG. 18 except that the fans are not provided. The backlight unit 900 includes a chassis 910 which has a front surface 910a and a rear surface 910b, LEDs 920 which are provided on the front surface 910a of the chassis 910 via LED substrates 922, and a LED driver section 930 attached to the rear surface 910b of the chassis 910.

In the description provided below, chassis 210 and 910 which have a porous alumina layer formed on their surface by performing the anodization and the pore sealing process on an aluminum base are referred to as chassis 210p and 910p, respectively. Chassis 210 and 910 which are formed of SECC are referred to as chassis 210s and 910s, respectively. Backlight units 200 and 900 which include the chassis 210p, 210s, 910p, and 910s as the chassis 210 and 910 are referred to as backlight units 200a, 200b, 900a, and 900b, respectively.

Figure 22:
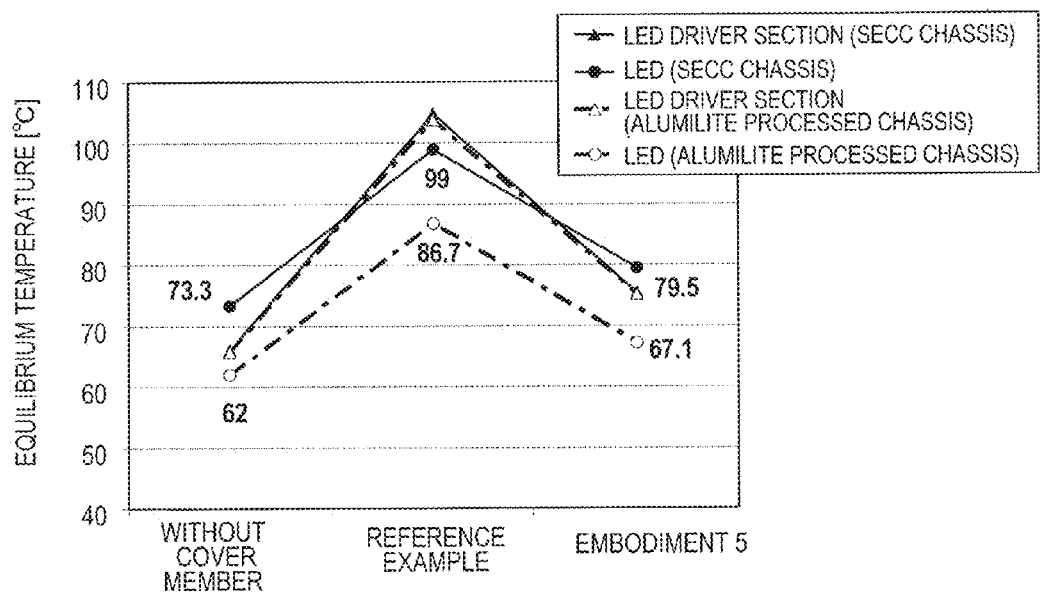
FIG. 22 A graph showing the equilibrium temperatures of the backlight unit of the reference example and the backlight unit shown in FIG. 18.

FIG. 22 shows the equilibrium temperatures of the backlight units 200a, 200b, 900a, and 900b. Here, the temperatures of the LEDs 220 and 920 and the LED driver sections 230 and 930 of the backlight units 200a, 200b, 900a, and 900b were measured. Note that, although now shown herein, respective ones of the backlight units 200a, 200b, 900a, and 900b were provided with cover members. For the sake of comparison, the temperatures of the backlight units 900a and 900b that were not provided with a cover member were also measured.

In the backlight units 900a and 900b, the equilibrium temperature of the LEDs 920 increases by about 25° C. due to the provision of the cover member. Note that the change of the equilibrium temperature of the backlight unit 900a is lower than that of the backlight unit 900b. This is probably because a porous alumina layer is provided on the surface of the chassis 910p, whereas the chassis 910s is formed of SECC so that the heat emission rate of the chassis 910p is higher than that of the chassis 910s.

In the backlight units 200a and 200b of the present embodiment, the equilibrium temperature can be decreased by the provision of the heat exhaust fans 240a as compared with the backlight unit 900 of the reference example. Specifically, the heat exhaust fans 240a enable to decrease the equilibrium temperature of the LEDs 220 in each of the backlight units 200a and 200b by about 20° C. as compared with the LEDs 920 of the backlight units 900a and 900b. The heat exhaust fans 240a enable to decrease the equilibrium temperature of the LED driver section 230 in each of the backlight units 200a and 200b by about 30° C. as compared with the LED driver section 930 of the backlight units 900a and 900b.

In the backlight units 200a and 200b, the heat exhaust fans 240a bring about a greater temperature decreasing effect on the LED driver section 230 than on the LEDs 220. This is probably because the LED driver section 230 is provided on the rear surface 210b of the chassis 210 whereas the LEDs 220 are provided on the front surface 210a of the chassis 210, the heat exhaust fans 240a efficiently move the air to which heat is transferred in the vicinity of the rear surface 210b of the chassis 210 away from the rear surface 210b of the chassis 210.

The decrease of the equilibrium temperature which is achieved by the heat exhaust fans 240a in the backlight unit 200a and the decrease of the equilibrium temperature which is achieved by the heat exhaust fans 240a in the backlight unit 200b are generally equal to each other. Note that, due to the difference between the chassis 210p that is formed of an aluminum base which has a porous alumina layer over its surface and the chassis 210s that is formed of SECC, the equilibrium temperature of the backlight unit 200a is lower than that of the backlight unit 200b.

As described above, by providing the heat exhaust fans 240a, the temperature of the backlight unit 200a, 200b can be decreased. Therefore, the operation of the LEDs 220 and the LED driver section 230 can be stabilized.

Hereinafter, the equilibrium temperatures of the backlight unit 900 of the reference example and the backlight units 200, 200' and 200" of the present embodiment are described with reference to FIG. 23.

Figure 23:
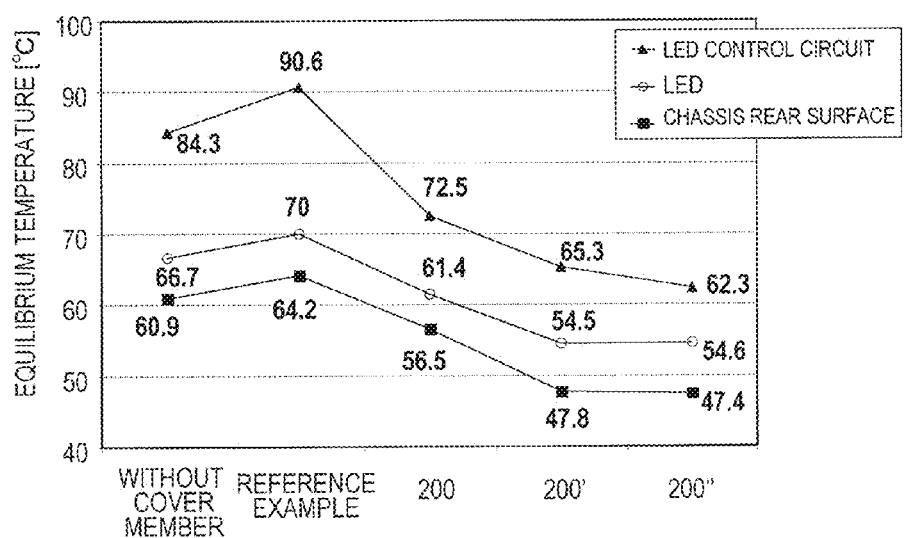
FIG. 23 A graph showing the equilibrium temperatures of the backlight unit of the reference example and the backlight units shown in FIG. 18 to FIG. 20.

FIG. 23 shows the measurement results of the equilibrium temperature of the rear surface 210b, 910b of the chassis 210, 910, the LEDs 220, 920, and the LED control circuit 232, 932 in respective ones of the backlight unit 900, the backlight unit 900 that is not provided with the cover member, the backlight unit 200 that includes the heat exhaust fans 240a, the backlight unit 200' that includes the air supply fans 240b, and the backlight unit 200" that includes both the heat exhaust fans 240a and the air supply fans 240b. Note that, herein, the chassis 210 and 910 of the backlight units 200, 200', 200", and 900 have a porous alumina layer over their surfaces, which was formed by performing the anodization and the pore sealing process on an aluminum base, for the purpose of efficiently decreasing the equilibrium temperature.

In each of the backlight units 200, 200' and 200", comparing the equilibrium temperatures of the rear surface 210b of the chassis 210, the LEDs 220, and the LED control circuit 232, the equilibrium temperature of the LED control circuit 232 is the highest, and the temperature of the rear surface 210b of the chassis 210 is the lowest. Note that the same applies to the backlight unit 900.

First, the rear surface 910b of the chassis 910 is discussed. By providing the cover member, the equilibrium temperature of the rear surface 910b increases. However, even when the cover member is provided, the heat exhaust fans 240a provided in the backlight unit 200 enable to decrease the equilibrium temperature of the rear surface 210b. Even when the cover member is provided, the air supply fans 240b provided in the backlight unit 200' enable to decrease the equilibrium temperature of the rear surface 210b. Note that, herein, the decrease of the equilibrium temperature which is achieved by the air supply fans 240b is greater than that which is achieved by the heat exhaust fans 240a. This is because the air supply fans 240b directly send air to the LED control circuit 232 so that the increase of the temperature which is attributed to the heat produced from the LED control circuit 232 can be efficiently prevented, whereas the heat exhaust fans 240a mainly expel the heat produced from the LEDs 220 to the outside so that the temperature decreasing effect of the heat exhaust fans 240a is not so high as compared with the temperature decreasing effect of the air supply fans 240b. In the backlight unit 200", both the heat exhaust fans 240a and the air supply fans 240b are provided so that the equilibrium temperature of the rear surface 210b can be further decreased.

The equilibrium temperatures of the LEDs 220 and 920 also have similar tendencies. The equilibrium temperatures of the LED control circuits 232 and 932 also have similar tendencies. However, the heat exhaust fans 240a and/or the air supply fans 240b bring about the greatest temperature decreasing effect on the LED control circuit 232 attached to the rear surface 210b of the chassis 210.

As described above, by providing the fans 240, the equilibrium temperature of the backlight unit 200, 200', 200" can be further decreased as compared with a case where the cover member is removed. Specifically, although providing the heat exhaust fans 240a enables to decrease the equilibrium temperature to some extent, providing the air supply fans 240b enables to further decrease the equilibrium temperature. Note that providing both the heat exhaust fans 240a and the air supply fans 240b enables to further decrease the equilibrium temperature.

INDUSTRIAL APPLICABILITY

According to the present invention, the heat releasing effect of a backlight unit can be improved. Such a backlight unit is suitably used for a liquid crystal display device which is for use as a display for digital signage.

REFERENCE SIGNS LIST 100, 200 backlight unit
110, 210 chassis
120, 220 light source (LED)

The invention claimed is:

1. A backlight unit, comprising:
   a chassis; and
   a light source attached to the chassis,
   wherein the chassis includes an aluminum base or aluminum layer, and a porous alumina layer or pore-sealed porous alumina layer provided on the aluminum base or aluminum layer, and
   wherein the porous alumina layer or pore-sealed porous alumina layer comprises a first region, extending from the aluminum base or aluminum layer to a top most surface of the porous alumina layer or pore-sealed porous alumina layer having a micropore formed therein, of a first thickness and a second region, extending from the aluminum base or aluminum layer to a top most surface of the porous alumina layer or pore-sealed porous alumina layer having a micropore formed therein, of a second thickness which is different from the first thickness.

2. The backlight unit of claim 1, further comprising a light source control circuit for controlling the light source.

3. The backlight unit of claim 2, wherein
   the chassis has a front surface and a rear surface,
   the light source is provided on the front surface of the chassis, and
   the light source control circuit is provided on the rear surface of the chassis.

4. The backlight unit of claim 2, wherein
   the chassis has an opening, and
   the backlight unit further comprises a connection portion in the opening for electrically coupling the light source control circuit and the light source.

5. The backlight unit of claim 1, wherein the light source includes a light-emitting diode.

6. The backlight unit of claim 1, further comprising at least one of an air supply fan and a heat exhaust fan.

7. The backlight unit of claim 6, wherein the air supply fan is attached generally parallel to a direction normal to the rear surface of the chassis.

8. The backlight unit of claim 6, wherein the heat exhaust fan is attached generally perpendicular to a direction normal to the rear surface of the chassis.

9. A liquid crystal display device, comprising:
   a liquid crystal panel; and
   the backlight unit as set forth in claim 1 for emitting light to the liquid crystal panel.

10. The backlight unit of claim 1, wherein the porous alumina layer or the pore-sealed porous alumina layer is an anodic porous alumina layer.

11. The backlight unit of claim 1, wherein the porous alumina layer or the pore-sealed porous alumina layer is formed by anodizing a surface of the aluminum base or aluminum layer.

12. The backlight unit of claim 1, the first thickness and the second thickness are at least 6 µm.

* * * * *